US011115893B2

(12) United States Patent
Peng et al.

(10) Patent No.: US 11,115,893 B2
(45) Date of Patent: Sep. 7, 2021

(54) INFORMATION TRANSMISSION METHOD, BASE STATION, AND USER EQUIPMENT

(71) Applicant: Huawei Technologies Co., Ltd., Shenzhen (CN)

(72) Inventors: Wenjie Peng, Shanghai (CN); Mingzeng Dai, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 111 days.

(21) Appl. No.: 16/521,383

(22) Filed: Jul. 24, 2019

(65) Prior Publication Data

US 2019/0349833 A1 Nov. 14, 2019

Related U.S. Application Data

(63) Continuation of application No. PCT/CN2018/073653, filed on Jan. 22, 2018.

(30) Foreign Application Priority Data

Jan. 26, 2017 (CN) .......................... 201710061732.5

(51) Int. Cl.
*H04W 36/32* (2009.01)
*H04W 76/11* (2018.01)
(Continued)

(52) U.S. Cl.
CPC ....... *H04W 36/32* (2013.01); *H04W 36/0033* (2013.01); *H04W 76/11* (2018.02); *H04W 76/27* (2018.02)

(58) Field of Classification Search
None
See application file for complete search history.

(56) References Cited

U.S. PATENT DOCUMENTS

2008/0261600 A1* 10/2008 Somasundaram .......................... H04W 36/0079
455/436
2013/0051338 A1* 2/2013 Ryu ........................ H04W 4/70
370/329

(Continued)

FOREIGN PATENT DOCUMENTS

CN 102348191 A 2/2012
CN 103874148 A 6/2014
(Continued)

OTHER PUBLICATIONS

Nokia: "Paging and Mobility in Inactive State", 3GPP TSG-RAN WG2 Meeting #93bis, Sophia Antipolis, France, Oct. 10-14, 2016, R3-162406, total 5 pages.

(Continued)

*Primary Examiner* — Otis L Thompson, Jr.
(74) *Attorney, Agent, or Firm* — Slater Matsil, LLP

(57) ABSTRACT

The present application provides an information transmission method. A first base station sends a context of a terminal to a second base station according to a request of the second base station. The request message of the second base station includes a first identifier, the first identifier is an identifier of the terminal in a non-connected mode in an area configured by the first base station, and the context of the terminal includes a core network-related context. The second base station may perform a corresponding RRC configuration based on the obtained context of the terminal. The first base station uses a RAT different from the second base station.

18 Claims, 10 Drawing Sheets

(51) Int. Cl.
*H04W 76/27* (2018.01)
*H04W 36/00* (2009.01)

(56) References Cited

U.S. PATENT DOCUMENTS

| | | | |
|---|---|---|---|
| 2013/0178214 | A1 | 7/2013 | Zhang et al. |
| 2015/0304988 | A1* | 10/2015 | Jin .................. H04W 64/003 |
| | | | 455/458 |
| 2017/0215142 | A1* | 7/2017 | Kim .................. H04W 24/02 |
| 2018/0220486 | A1* | 8/2018 | Tseng ................ H04W 76/27 |
| 2019/0021128 | A1* | 1/2019 | Sivavakeesar .......... H04W 4/70 |
| 2019/0082490 | A1 | 3/2019 | Zhang et al. |
| 2019/0335314 | A1* | 10/2019 | He .................... H04W 40/36 |
| 2019/0349838 | A1* | 11/2019 | Futaki ................ H04W 88/08 |
| 2020/0163148 | A1* | 5/2020 | Futaki ................ H04W 36/36 |

FOREIGN PATENT DOCUMENTS

| | | |
|---|---|---|
| CN | 105898894 A | 8/2016 |
| JP | 2010530181 A | 9/2010 |

OTHER PUBLICATIONS

Qualcomm Incorporated, On dual attach in EPC and NG Core. SA WG2 Meeting #118 Nov. 14-18, 2016, Reno, NV, USA, S2-166546, 7 pages.

Intel Corporation: "Signalling reduction during NG Core connected Inter-RAT mobility in Inactive state", 3GPP DRAFT; R2-1700319, vol. RAN WG2 No. Spokane, USA; 20170117-20170119, Jan. 17, 2017, 4 pages.

Intel Corporation: "Discussion on RAN specific notification area", 3GPP DRAFT; R2-1700331, vol. RAN WG2 No. Spokane, USA; 20170117-20170119, Jan. 17, 2017, 4 pages.

Ericsson: "Signalling flows for paging and resume for RRC Inactive", 3GPP DRAFT; R2-1700536, vol. RAN WG2 No. Spokane Wa; 20170117-20170119, Jan. 17, 2017, 7 pages.

Qualcomm Incorporated: "RRC inactive and RAN paging end-to-end behaviour", 3GPP DRAFT; S2-166537, vol. SA WG2 No. Reno US, Nov. 14, 2016, 9 pages.

Ericsson: "Mobility between LTE and NR for Inactive UEs", 3GPP DRAFT; R2-168301, vol. RAN WG2, No. Reno, Nevada, USA, Nov. 13, 2016, 4 pages.

Huawei et al, "On the size of UE identity", 3GPP TSG RAN WG1 NR Ad Hoc Meeting, R1-1700404, Jan. 16-20, 2017, 2 pages, Spokane, USA.

* cited by examiner

INFORMATION TRANSMISSION METHOD, BASE STATION, AND USER EQUIPMENT

CROSS-REFERENCE TO RELATED APPLICATIONS

This application is a continuation of International Application No. PCT/CN2018/073653, filed on Jan. 22, 2018, which claims priority to Chinese Patent Application No. 201710061732.5, filed on Jan. 26, 2017. The disclosures of the aforementioned applications are hereby incorporated by reference in their entireties.

TECHNICAL FIELD

Embodiments of this application relate to wireless communications technologies, and in particular, to an information transmission method, a base station, and user equipment.

BACKGROUND

In a communication process between user equipment (UE) and a network side, the UE usually has two modes: an idle mode and a connected mode. During switching of the UE from the idle mode to the connected mode, both establishing a connection between the UE and the network side and establishing a connection between a base station and a core network for the UE requires a large amount of signaling interaction. In addition, signaling interaction causes a data sending latency of the UE, and consequently, service data transmission is affected.

To reduce signaling overheads on an air interface and a network interface and reduce a communication latency, a light connected mode is designed for the UE in a long term evolution (LTE) system, and an inactive mode is designed for the UE in a new radio (NR) system. When the UE is in the light connected mode or the inactive mode, an air interface connection between the UE and the base station is released. However, the UE retains all configurations, the base station retains a context of the UE, and the connection previously established between the base station and the core network for the UE is also retained.

To ensure communication quality, the UE is handed over between serving base stations when it is moving. In the prior art, if a previous serving base station and a new serving base station of UE are of different RATs, when the UE in the inactive mode or the light connected mode is handed over to the new serving base station, the previous serving base station releases all contexts of the UE. Further, regenerating a context for the UE by the new serving base station requires a large amount of signaling interaction on an interface between base stations and a large amount of signaling interaction on an air interface, causing high signaling overheads.

SUMMARY

Embodiments of this application provide an information transmission method, a base station, user equipment, and a communications system.

According to a first aspect, an embodiment of this application provides an information transmission method. The method includes sending, by a first base station, a first indication to a terminal, where the first indication includes a first identifier allocated by the first base station to the terminal, the first indication is used to instruct the terminal to enter a non-connected mode, and the first identifier is an identifier of the terminal in the non-connected mode in an area configured by the first base station. The method also includes receiving, by the first base station, a request message from a second base station, where the request message is used to request a context of the terminal from the first base station, and the request message includes the first identifier. The method also includes sending, by the first base station, the context of the terminal to the second base station, where the first base station is a first-RAT base station, and the second base station is a second-RAT base station.

According to the information transmission method provided in this embodiment of this application, UE enters a non-connected mode under an instruction of the first-RAT base station. When the UE in the non-connected mode moves to a cell of the second-RAT base station, the first-RAT base station sends a context of the UE to the second-RAT base station according to a request of the second-RAT base station. The second-RAT base station performs a radio resource control (RRC) configuration based on the received context of the UE, to perform an RRC connection between the second-RAT base station and the UE. When performing the RRC configuration, including generating the RRC configuration for the UE, the second-RAT base station can use the context of the UE that is sent by the first-RAT base station, for example, a core network-related context of the UE. Therefore, in a communication process between the second-RAT base station and the UE, signaling interaction on an interface between the base stations and signaling interaction on an air interface can be reduced, thereby reducing signaling overheads and a communication latency.

In a possible implementation of the first aspect, the sending, by the first base station, the context of the terminal to the second base station includes: sending, by the first base station, a core network-related context of the terminal to the second base station.

In a possible implementation of the first aspect, the sending, by the first base station, the context of the terminal to the second base station includes: sending, by the first base station, a first-RAT RRC context of the terminal and a core network-related context of the terminal to the second base station.

In a possible implementation of the first aspect, the sending, by the first base station, the context of the terminal to the second base station includes: sending, by the first base station, a first-RAT RRC context of the terminal, a second-RAT RRC context of the terminal, and a core network-related context of the terminal to the second base station.

The core network-related context includes one or more types of the following information: core network security information, a temporary mobile subscriber identity (TMSI) of the UE, protocol data unit (protocol data unit, PDU) session information, a core network interface identifier of the UE, and UE capability information.

An RRC context includes an RRC configuration and status information generated in a communication process between the UE and a network side.

It can be learned that the second base station may perform a corresponding RRC configuration based on different content included in the received context of the terminal. Optionally, if the context of the terminal includes the second-RAT RRC context, namely, an RRC context corresponding to an RAT of the second base station, the second base station may directly use an RRC configuration in the second-RAT RRC context, and a process of generating a new second-RAT RRC configuration for the UE may be omitted, thereby reducing signaling overheads.

In a possible implementation of the first aspect, the first base station receives indication information from the second base station, where the indication information is used to indicate an RAT of the second base station.

In a possible implementation of the first aspect, a format of the first identifier is different from a format of an identifier allocated by the second base station to the terminal in the non-connected mode. Optionally, a length of the first identifier is different from a length of the identifier allocated by the second base station to the terminal in the non-connected mode.

According to a second aspect, an embodiment of the present invention provides an information transmission method. The method includes receiving, by a second base station from a terminal, a first identifier allocated by a first base station to the terminal, where the first identifier is an identifier of the terminal in a non-connected mode in an area configured by the first base station. The method also includes identifying, by the second base station, the first base station based on the first identifier. The method also includes sending, by the second base station, a request message to the first base station, where the request message is used to request a context of the terminal from the first base station, and the request message includes the first identifier. The method also includes receiving, by the second base station, the context of the terminal from the first base station. The method also includes performing, by the second base station, an RRC configuration based on the context of the terminal, where the first base station is a first-RAT base station, and the second base station is a second-RAT base station.

In a possible implementation of the second aspect, the receiving, by the second base station, the context of the terminal from the first base station includes: receiving, by the second base station, a core network-related context of the terminal from the first base station.

In a possible implementation of the second aspect, the receiving, by the second base station, the context of the terminal from the first base station includes: receiving, by the second base station, a core network-related context of the terminal and a first-RAT RRC context of the terminal from the first base station.

In a possible implementation of the second aspect, the receiving, by the second base station, the context of the terminal from the first base station includes: receiving, by the second base station, a core network-related context of the terminal, a first-RAT RRC context of the terminal, and a second-RAT RRC context of the terminal from the first base station.

In a possible implementation of the second aspect, the performing, by the second base station, an RRC configuration based on the context of the terminal includes: generating, by the second base station, a second-RAT RRC configuration based on the context of the terminal; and sending, by the second base station, the second-RAT RRC configuration to the terminal. The second base station may generate the second-RAT RRC configuration for UE based on the core network-related context in the context of the terminal.

In a possible implementation of the second aspect, the performing, by the second base station, an RRC configuration based on the context of the terminal includes: performing, by the second base station, a second-RAT RRC configuration included in the context of the terminal.

In a possible implementation of the second aspect, a format of the first identifier is different from a format of an identifier allocated by the second base station to the terminal in the non-connected mode. Optionally, a length of the first identifier is different from a length of the identifier allocated by the second base station to the terminal in the non-connected mode.

According to a third aspect, an embodiment of the present invention provides an information transmission method. The method includes receiving, by a terminal, a first indication from a first base station, where the first indication includes a first identifier allocated by the first base station to the terminal, the first indication is used to instruct the terminal to enter a non-connected mode, and the first identifier is an identifier of the terminal in the non-connected mode in an area configured by the first base station. The method also includes sending, by the terminal, the first identifier to a second base station, where the first identifier is used by the second base station to request a context of the terminal from the first base station, the first base station is a first-RAT base station, and the second base station is a second-RAT base station. The method also includes performing, by the terminal, an RRC configuration based on the context of the terminal.

In a possible implementation of the third aspect, the method further includes: releasing, by the terminal, a first-RAT RRC context except security configuration information, and retaining a core network-related context. The security configuration information includes a key.

In a possible implementation of the third aspect, the method further includes: retaining, by the terminal, a first-RAT RRC context and a core network-related context.

Optionally, UE may determine, by using an air interface message, or in another manner, whether a current serving base station and a previous serving base station are base stations of different RATs, to further determine to release or retain an RRC context related to the previous serving base station.

In a possible implementation of the third aspect, the sending, by the terminal, the first identifier to a second base station includes: sending, by the terminal, an area update message to the second base station, where the area update message includes the first identifier.

In a possible implementation of the third aspect, a format of the first identifier is different from a format of an identifier allocated by the second base station to the terminal in the non-connected mode. Optionally, a length of the first identifier is different from a length of the identifier allocated by the second base station to the terminal in the non-connected mode.

To implement the information transmission method according to the first aspect, according to a fourth aspect, an embodiment of this application provides a base station, and the base station has a function of implementing behavior of the first base station in the information transmission method. The function may be implemented by using hardware, or may be implemented by executing corresponding software by hardware. The hardware or the software includes one or more modules corresponding to the function.

In a possible implementation of the fourth aspect, the base station includes a plurality of functional units, configured to implement any information transmission method according to the first aspect. The base station sends a context of a terminal to a second base station, so that the second base station performs an RRC configuration based on the context of the terminal. Therefore, in a communication process between the second base station and the terminal, signaling interaction on an interface between the base stations and signaling interaction on an air interface are reduced, thereby reducing signaling overheads and a communication latency.

In a possible implementation of the fourth aspect, a structure of the base station includes a processor and a transceiver. The processor is configured to support the base station in performing a corresponding function in the foregoing information transmission method. The transceiver is configured to: support communication between the base station and the terminal, and send information or an instruction used in the foregoing information transmission to the terminal. The base station may further include a memory. The memory is configured to be coupled to the processor, and the memory stores a program instruction and data that are necessary for the base station. The base station may further include a communications interface. The communications interface is configured to communicate with another base station device or a core network device.

To implement the information transmission method according to the second aspect, according to a fifth aspect, an embodiment of this application provides a base station, and the base station has a function of implementing behavior of the second base station in the information transmission method. The function may be implemented by using hardware, or may be implemented by executing corresponding software by hardware. The hardware or the software includes one or more modules corresponding to the function.

In a possible implementation of the fifth aspect, the base station includes a plurality of functional units, configured to implement any information transmission method according to the second aspect. The base station receives a context of a terminal from a first base station, so that the base station performs an RRC configuration based on the context of the terminal. Therefore, in a communication process between the second base station and the terminal, signaling interaction on an interface between the base stations and signaling interaction on an air interface are reduced, thereby reducing signaling overheads and a communication latency.

In a possible implementation of the fifth aspect, a structure of the base station includes a processor and a transceiver. The processor is configured to support the base station in performing a corresponding function in the foregoing information transmission. The transceiver is configured to: support communication between the base station and the terminal, and send information or an instruction used in the foregoing information transmission method to the terminal. The base station may further include a memory. The memory is configured to be coupled to the processor, and the memory stores a program instruction and data that are necessary for the base station. The base station may further include a communications interface. The communications interface is configured to communicate with another base station device or a core network device.

To implement the information transmission method according to the third aspect, according to a sixth aspect, an embodiment of this application provides a terminal, and the terminal has a function of implementing behavior of the terminal in the information transmission method. The function may be implemented by using hardware, or may be implemented by executing corresponding software by hardware. The hardware or the software includes one or more modules corresponding to the function.

In a possible implementation of the sixth aspect, the terminal includes a plurality of functional units, configured to implement any information transmission method according to the third aspect. The terminal sends a first identifier to a second base station, so that the second base station requests a context of the terminal from a first base station. Therefore, in a communication process between the second base station and the terminal, signaling interaction on an interface between the base stations and signaling interaction on an air interface are reduced, thereby reducing signaling overheads and a communication latency.

In a possible implementation of the sixth aspect, a structure of the terminal includes a processor and a transceiver. The processor is configured to support the terminal in performing a corresponding function in the foregoing information transmission method. The transceiver is configured to support communication between the terminal and a base station. The terminal may further include a memory. The memory is configured to be coupled to the processor, and the memory stores a program instruction and data that are necessary for the terminal.

According to a seventh aspect, an embodiment of the present invention provides a communications system, including the base station according to the fourth aspect and the base station according to the fifth aspect. The communications system may further include the terminal according to the sixth aspect.

According to an eighth aspect, an embodiment of this application provides a computer readable storage medium. The computer readable storage medium stores an instruction. When the instruction runs on a computer, the computer performs the information transmission method in the foregoing aspects.

According to a ninth aspect, an embodiment of this application provides a computer program product including an instruction. When the instruction runs on a computer, the computer performs the information transmission method in the foregoing aspects.

According to the technical solutions provided in the embodiments of this application, the terminal enters the non-connected mode under the instruction of the first-RAT base station. When the terminal in the non-connected mode moves to the cell of the second-RAT base station, the first-RAT base station sends the context of the terminal to the second-RAT base station according to the request of the second-RAT base station. The second-RAT base station performs the RRC configuration based on the received context of the terminal, to complete the RRC connection to the terminal. When performing the RRC configuration, including generating the RRC configuration for the terminal, the second-RAT base station can use the context of the terminal that is sent by the first-RAT base station, for example, the core network-related context of the terminal. Therefore, in a communication process between the second-RAT base station and the terminal, signaling interaction on an interface between the base stations and signaling interaction on an air interface can be reduced, thereby reducing signaling overheads and a communication latency.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DETAILED DESCRIPTION OF ILLUSTRATIVE EMBODIMENTS

Figure 1:
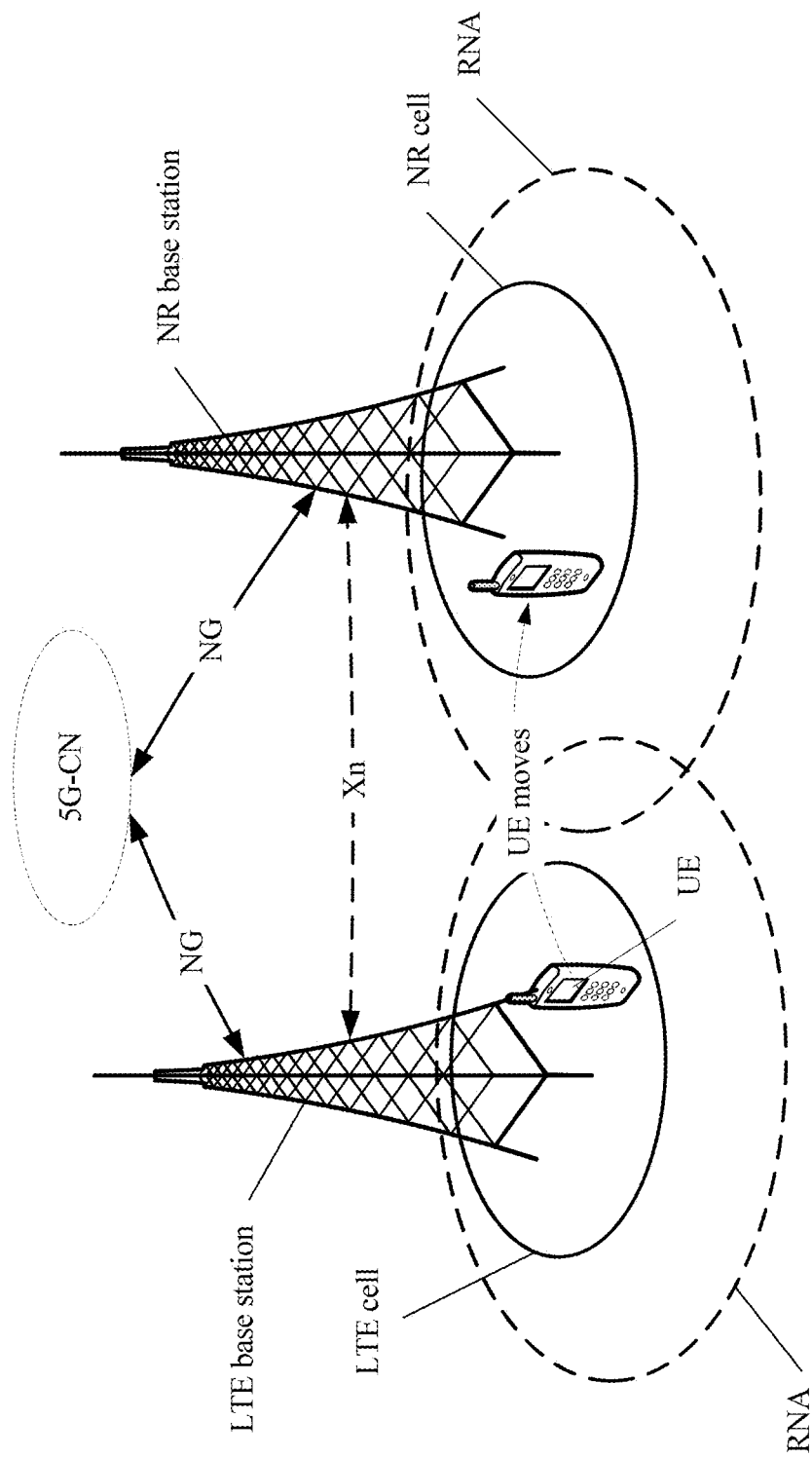
FIG. 1 is a schematic diagram of a communications system according to an embodiment of this application.

A technology described in embodiments of this application may be applied to a plurality of communications systems such as a 4G (the 4th generation) system such as an LTE system, and 5G (the 5th generation) systems such as an NR communications system and an evolved LTE (eLTE) system.

A base station device described in the embodiments of this application includes an evolved NodeB (eNodeB, eNB, or e-NodeB) in the LTE system, or a base station device in the NR system, such as a gNB, a transmission reception point (TRP), or a central unit (CU). When the LTE eNB can be connected to a 5G core network, the LTE eNB may also be referred to as an eLTE eNB. Specifically, the eLTE eNB is an LTE base station device evolved from the LTE eNB, and can be directly connected to the 5G core network (5G-Core, 5G CN). A base station type is not specially limited in the embodiments of this application.

The 5G CN in the embodiments of this application may also be referred to as a new core network (New Core), a 5G New Core, or the like. The 5G CN is disposed independently of an existing core network such as an evolved packet core (EPC) network.

UE in the embodiments of this application may include a handheld device, a vehicle-mounted device, a wearable device, or a computing device that has a wireless communication function or another processing device connected to a wireless modem, and various forms of user equipments, mobile stations (MS), terminals, terminal devices (terminal equipment), and the like. For ease of description, in the embodiments of this application, these devices are referred to as "user equipment" or "UE".

In the embodiments of this application, a unidirectional communication link from a base station to UE is defined as a downlink, and a unidirectional communication link from the UE to the base station is defined as an uplink.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

In the embodiments of this application, "a plurality of" means two or more.

Descriptions such as "first" and "second" in the embodiments of this application are merely used to illustrate and distinguish between described objects, and are not indented to indicate a sequence or indicate a special limitation on a quantity of devices in the embodiments of this application. These descriptions cannot constitute any limitation on the embodiments of this application.

In the embodiments of this application, "connection" means various connection manners such as a direct connection or an indirect connection, for implementing communication between devices. This is not limited in the embodiments of this application.

In the embodiments of this application, "network" and "system" are a same concept, and a communications system is a communications network.

FIG. 1 is a schematic diagram of a communications system according to an embodiment of this application.

The communications system shown in FIG. 1 includes an LTE-RAT base station device (shown as an LTE base station below and in FIG. 1) and an NR-RAT base station device (shown as an NR base station below and in FIG. 1).

The LTE base station and the NR base station are respectively connected to a 5G CN by using NG interfaces, and a direct communications interface, for example, an Xn interface shown in the figure, may exist between the LTE base station and the NR base station, and is used for an information exchange between the base stations. It may be understood that if no direct communications interface is established between the LTE base station and the NR base station, information exchanged between the LTE base station and the NR base station may be forwarded by using the 5G CN. It may be understood that, in this embodiment of this application, both the NG interface and the Xn interface are examples. The two types of interfaces may also be represented by using another name. This is not specially limited.

As shown in FIG. 1, the LTE base station and the NR base station separately manage at least one cell. In this embodiment of this application, a cell managed by the LTE base station is referred to as an LTE cell, and a cell managed by the NR base station is referred to as an NR cell.

It is assumed that UE enters the NR cell, accesses the NR base station, and obtains a communication service provided by the NR base station. When determining that the UE in a connected mode does not transmit service data within a period of time, the NR base station, may instruct the UE to enter an inactive mode. In the inactive mode, an air interface connection between the UE and the NR base station is released, but the UE retains various types of configuration information configured by the NR base station for the UE; the NR base station retains a context of the UE, and the NR base station retains a connection established between the NR base station and the 5G CN for the UE. Similarly, if the UE accesses the LTE eNB, the UE may enter a light connected mode under an instruction of the LTE eNB. The light connected mode is similar to the inactive mode, and is not described again.

In this embodiment of this application, the inactive mode, the light connected mode, and the like represent a third mode of the UE other than an idle mode and the connected mode, and are collectively referred to as a "non-connected mode".

In a moving process, the UE updates a serving base station to maintain communication quality. When the UE moves out of a radio access network based notification area (RAN based notification area, RNA) configured by a previous serving base station for the UE or the UE moves out of a radio access network based paging area (RAN based paging area, RPA) to enter an RNA or an RPA of a new serving base station, the UE first initiates an area update process to the new serving base station to access the new serving base station, and then the UE may switch to a connected mode. For example, as shown in FIG. 1, the UE moves from the LTE cell to the NR cell, and the LTE cell and the NR cell belong to different RNAs. Therefore, the UE may initiate the area update process to the NR base station.

Alternatively, in another scenario that is not shown in FIG. 1, after movement, the UE is still located within an RNA range configured by a previous serving base station, but enters a cell of a base station of a different RAT. For example, the previous serving base station of the UE is an LTE base station and the UE enters an NR cell in an RNA to which the LTE base station belongs, or the previous serving base station is an NR base station and the UE enters an LTE cell in an RNA to which the NR base station belongs. In this case, if the UE transmits an uplink service or a downlink service, the UE first enters the connected mode in a new serving base station.

The RNA may include at least one cell, or may include at least one location area. The location area may include one or more cells. When the location area includes a plurality of cells, the plurality of cells may be of a same RAT or different RATs. The location area may be alternatively a tracking area (TA) or the like in an LTE system or a 5G system.

Both the LTE base station and the NR base station are connected to the 5G CN, and interfaces between the 5G CN and each of the two base stations are both NG interfaces. There is a third mode other than the connected mode and the idle mode in both the LTE system and an NR system, and mechanisms of the two third modes are basically the same. Therefore, an embodiment of this application provides an information transmission method, so that when UE is handed over between base stations of different RATs that are connected to a same core network, the UE may retain a context of the UE in a previous serving base station. For example, when the UE is handed over between an LTE base station and an NR base station that are connected to a same 5G CN, the UE may directly switch between a light connected mode of the LTE base station and an inactive mode of the NR base station, thereby resolving a problem that when UE that is in a non-connected mode under an instruction of a previous serving base station accesses a new serving base station of a different RAT, the UE needs to enter an idle mode first, and then switches to a connected mode, and consequently, a communication latency is prolonged.

Figure 2:
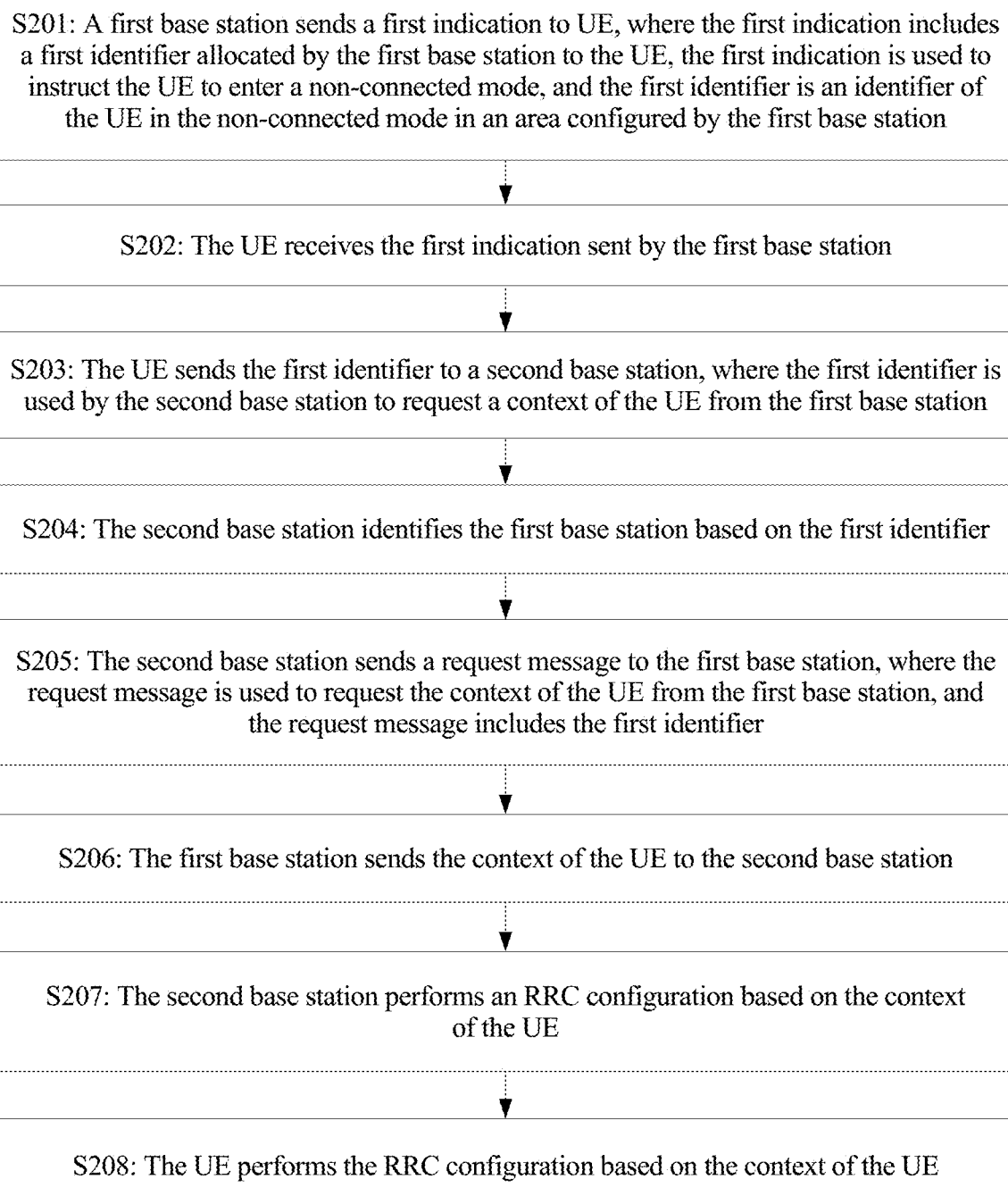
FIG. 2 is a schematic flowchart of an information transmission method according to an embodiment of this application.

FIG. 2 is a schematic flowchart of an information transmission method according to an embodiment of this application. The method may be applied to the communications system shown in FIG. 1.

The communications system includes a first base station and a second base station that are connected to a same core network, and the first base station and the second base station are base stations of different RATs. For ease of description, in this embodiment of this application, a communications RAT used by the first base station is referred to as a "first RAT", and a communications RAT used by the second base station is referred to as a "second RAT".

It may be understood that a specific RAT of the first base station and a specific RAT of the second base station are not specially limited in this embodiment of this application. For example, the first base station is an LTE base station and the second base station is an NR base station; or the first base station is an NR base station and the second base station is an LTE base station.

The method includes the following steps.

S201: The first base station sends a first indication to UE, where the first indication includes a first identifier allocated by the first base station to the UE, the first indication is used to instruct the UE to enter a non-connected mode, and the first identifier is an identifier of the UE in the non-connected mode in an area configured by the first base station.

Specifically, the first base station may allocate an identifier to the UE in the non-connected mode in the area configured by the first base station. The area may be an RNA or an RPA, and the RNA or the RPA includes at least one cell or at least one location area. When the UE moves between cells in the area configured by the first base station, the UE may not notify the first base station of a moving status of the UE. When the UE moves to a cell outside the area, the UE may initiate an area update to a base station of the cell.

In a moving process, a serving base station of the UE may switch from the first base station to the second base station. The first base station is referred to as an anchor base station of the UE, or is referred to as a previous serving base station. The second base station is referred to as a current serving base station of the UE, or is referred to as a new serving base station.

Specifically, the UE first accesses the first base station. When determining that the UE can enter the non-connected mode, the first base station sends corresponding indication information to the UE. In this embodiment of this application, a condition for determining, by the first base station, that the UE enters the non-connected mode is not specially limited. For example, the first base station may use a timer. If no service data is transmitted between the UE and the first base station within a time specified by the timer, the first base station instructs the UE to enter the non-connected mode.

Optionally, when the first base station is an LTE base station and the second base station is an NR base station, the non-connected mode is a light connected mode. In other words, the LTE base station instructs the UE to enter the light connected mode.

Optionally, when the first base station is an NR base station and the second base station is an LTE base station, the non-connected mode is an inactive mode. In other words, the NR base station instructs the UE to enter the inactive mode.

S202: The UE receives the first indication sent by the first base station.

After receiving the first indication, the UE enters the non-connected mode. To be specific, the UE releases an air interface connection from the first base station, but the UE retains a first-RAT context of the UE. In addition, the first base station retains an RRC context of the UE and a core network-related context, and also retains a connection established between the first base station and the core network for the UE.

Specifically, after receiving the first indication, the UE may retain the first-RAT context of the UE, including retaining the first-RAT RRC context and the core network-related context. The first-RAT RRC context may be generated by the first base station for the UE.

Optionally, the first-RAT RRC context may include an RRC configuration and other RRC-related information. The RRC configuration is generated for the UE when a first-RAT base station, for example, the first base station serves as a serving base station of the UE, and the other RRC-related information is generated in a communication process between the UE and the first-RAT base station, for example, the first base station. The other RRC-related information includes status information. Specifically, the RRC configuration includes information such as a bearer configuration and a protocol layer configuration. The status information includes information such as a sequence number of a bearer used by the UE.

It may be understood that an RRC configuration generated by a base station of an RAT is corresponding to the RAT of the base station, and RRC configurations of different RATs have different information element designs or different format designs. For example, a format of a first-RAT RRC configuration is corresponding to an RAT of the first base station, and a format of a second-RAT RRC configuration is corresponding to an RAT of the second base station. RRC configurations of different RATs are transparent to each other. Specifically, a base station of one RAT does not understand an RRC configuration in a base station of another RAT. For example, the first base station does not understand the second-RAT RRC configuration, and the second base station does not understand the first-RAT RRC configuration.

The core network-related context is core network-related information in a context of the UE, and may include one or more types of the following information: core network security information, a TMSI of the UE, PDU session information, a core network interface identifier of the UE, and UE capability information.

S203: The UE sends the first identifier to the second base station, where the first identifier is used by the second base station to request a context of the UE from the first base station.

Optionally, the UE sends an area update message to the second base station, and the area update message includes the first identifier. The area update message is used by the UE to request, when the UE moves out of an area configured by a previous serving base station (for example, the first base station) and enters a cell of a new serving base station (for example, the second base station), the new serving base station to configure an area such as an RNA or an RPA for the UE. In an area update process initiated by the UE, the UE may trigger the new serving base station to request the context of the UE from the previous serving base station. The context of the UE is used by the new serving base station to generate, for the UE in a process in which the UE accesses the new serving base station, an RRC configuration corresponding to an RAT of the new serving base station.

Optionally, the UE further sends verification information to the second base station. The verification information is used by the first base station to verify the UE when the second base station requests the context of the UE from the first base station, to determine that an identity of the UE is correct, and avoid a request error. The verification information may be a short message authentication code for integrity (short MAC-I). Optionally, the verification information may be included in the area update message.

Optionally, the UE identifies that the RAT of the second base station is different from the RAT of the first base station. Therefore, the UE releases the first-RAT RRC context except security configuration information, and retains the core network-related context. The security configuration information is a type of RRC configuration, and may be specifically a key. The key may be used to encrypt and decrypt data when the UE performs communication.

Optionally, the UE may distinguish between the RAT of the first base station and the RAT of the second base station by using different air interface messages. Specifically, after entering a cell of the second base station, the UE may receive a broadcast message of the second base station. The UE may determine an RAT of the current cell based on the broadcast message, or the UE may compare a format of the broadcast message of the second base station with a format of a previously obtained broadcast message of the first base station. If the two broadcast messages have different formats, the UE determines that the first base station and the second base station are of different RATs. It may be understood that in this embodiment of this application, a manner in which the UE distinguishes between RATs of base stations is not specially limited.

Optionally, even if the UE identifies that the RAT of the first base station is different from the RAT of the second base station, the UE may still retain the first-RAT RRC context. When the UE re-enters a cell of the first base station or a base station having a same RAT as that of the first base station, namely, the first-RAT base station, and uses the first-RAT base station as a serving base station, the UE may directly use the RRC configuration in the previously retained first-RAT RRC context, and does not need to obtain the RRC configuration from the first-RAT base station again, thereby reducing signaling overheads.

S204: The second base station identifies the first base station based on the first identifier.

Optionally, a format of the first identifier is different from a format of an identifier of the UE in the non-connected mode in the second base station.

Specifically, each base station accessed by the UE may allocate an identifier in the base station to the UE, and a format of an identifier of the UE that is allocated by each base station is corresponding to an RAT of the base station. It is assumed that the identifier of the UE in the non-connected mode in the second base station is referred to as a second identifier. That the format of the first identifier is different from the format of the second identifier includes: A length of the first identifier is different from a length of the second identifier.

Alternatively, a constituent part of the first identifier is different from a constituent part of the second identifier. Specifically, a total length of the first identifier may be the same as a total length of the second identifier. The first identifier and the second identifier each include two parts: a base station identifier and an identifier allocated by a base station to the UE. However, a length of a base station identifier in the first identifier is different from a length of a base station identifier in the second identifier, and a length of an identifier of the UE in the first identifier is different from a length of an identifier of the UE in the second identifier. For example, an identifier allocated by the NR base station to the UE may be longer than an identifier allocated by the LTE base station to the UE.

The first identifier is a unique identifier that is allocated by the first base station to the UE to indicate the UE in the non-connected mode, and the format of the first identifier is corresponding to the RAT of the first base station. Therefore, the second base station may identify, by using the first identifier, the RAT of the first base station and which base station is the first base station.

S205: The second base station sends a request message to the first base station, where the request message is used to request the context of the UE from the first base station, and the request message includes the first identifier.

Optionally, the request message further includes indication information, and the indication information is used to indicate the RAT of the second base station. The first base station may determine, based on the indication information, that the second base station and the first base station are base stations of different RATs, to determine specific content of the context of the UE that is to be sent to the second base station.

Optionally, when a communications interface is established between the second base station and the first base station, the second base station and the first base station send indication information to each other, to indicate the RATs of the base stations.

Optionally, the request message further includes the verification information of the UE.

S206: The first base station sends the context of the UE to the second base station.

Specifically, after receiving the request message of the second base station, the first base station may verify the UE based on the first identifier and the verification information in the request message. After completing the verification, the first base station sends a reply message to the second base station. The reply message includes the context of the UE.

Optionally, the first base station sends the core network-related context of the UE to the second base station. Specifically, when the first base station determines, based on the indication information sent by the second base station, that the second base station and the first base station are base stations of different RATs, the first base station may send the core network-related context of the UE to the second base station. Optionally, the first base station may further send the security configuration information to the second base station.

Optionally, the first base station sends the first-RAT RRC context of the UE and the core network-related context of the UE to the second base station.

Optionally, the first base station sends the first-RAT RRC context of the UE, a second-RAT RRC context of the UE, and the core network-related context of the UE to the second base station. The second-RAT RRC context of the UE may be an RRC context of the UE that is obtained by the first base station from a second-RAT base station, for example, the second base station or another base station having a same RAT as that of the second base station, that is retained by the first base station, and that is in the second-RAT base station.

S207: The second base station performs an RRC configuration based on the context of the UE.

Optionally, in an implementation of this application, when the context of the UE that is received by the second base station from the first base station includes only the core network-related context of the UE, or includes the core network-related context and the first-RAT RRC context of the UE, the second base station may generate the RRC configuration for the UE based on the core network-related context of the UE. In addition, the second base station performs the generated RRC configuration. The RRC configuration is corresponding to the RAT of the second base station. The RRC configuration may also be referred to as a second-RAT RRC configuration.

In addition, because the second base station and the first base station are base stations of different RATs, RRC configurations of the two types of base stations are transparent to each other. If the second base station further receives the first-RAT RRC context from the first base station, the second base station retains the first-RAT RRC context, but does not parse the first-RAT RRC context.

Optionally, after receiving the second-RAT RRC configuration sent by the second base station, the UE may release the first-RAT RRC context.

Optionally, in an implementation of this application, when the context of the UE that is received by the second base station from the first base station includes the second-RAT RRC configuration, the second base station may directly perform the second-RAT RRC configuration. Specifically, the first base station may obtain the second-RAT RRC context from a base station having a same RAT as that of the second base station, the second-RAT RRC context includes the second-RAT RRC configuration, and the second base station may directly use the second-RAT RRC configuration. In addition, the UE also retains the RRC context that includes the second-RAT RRC configuration. In other words, the second base station and the UE retain the same RRC configuration. Therefore, the second base station does not need to send the second-RAT RRC configuration to the UE.

Optionally, in an implementation of this application, when the context of the UE that is received by the second base station from the first base station includes the second-RAT RRC context, the second base station may update the second-RAT RRC context, and send an updated RRC configuration to the UE. For example, when the UE accesses the second base station, a service of the UE ends, and a quantity of bearers of the UE actually decreases. Therefore, the second base station may update a quantity of bearers in the received second-RAT RRC configuration, and send the updated quantity of bearers to the UE. The second base station may send only a specific updated configuration to the UE, or send all all updated RRC configurations to the UE.

S208: The UE performs the RRC configuration based on the context of the UE.

The RRC configuration may be the second-RAT RRC configuration that is generated by the second base station based on the context of the UE. Alternatively, the RRC configuration may be the second-RAT RRC configuration that is retained by the UE. The UE may perform an RRC connection to the second base station by using the second-RAT RRC configuration.

Optionally, in an implementation of this application, the UE receives and performs the second-RAT RRC configuration generated by the second base station for the UE. The second-RAT RRC configuration received by the UE may be updated by the second base station based on an RRC configuration of another second-RAT base station, or may be a complete RRC configuration generated by the second base station for the UE. Details are not described.

Optionally, in an implementation of this application, the UE retains an RRC configuration obtained from another second-RAT base station. In this case, in a process of establishing an RRC connection to the second base station, the UE may continue to use the RRC configuration, and does not need to receive a new RRC configuration from the second base station.

It may be understood that when the UE and the second base station use respectively retained second-RAT RRC configurations, an execution sequence of S206 and S207 does not need to be limited, and the two steps may be performed simultaneously. An execution sequence of S206 and S207 shown in FIG. 2 is merely an example, and does not constitute any limitation on this application.

According to the information transmission method provided in this embodiment of this application, the UE enters the non-connected mode under an instruction of the first-RAT base station. When the UE in the non-connected mode moves to a cell of the second-RAT base station, the first-RAT base station sends the context of the UE to the second-RAT base station according to a request of the second-RAT base station. The second-RAT base station performs the RRC configuration based on the received context of the UE, to perform the RRC connection between the second-RAT base station and the UE. When performing the RRC configuration, including generating the RRC configuration for the UE, the second-RAT base station can use the context of the UE that is sent by the first-RAT base station, for example, the core network-related context of the UE. Therefore, in a communication process between the second-RAT base station and the UE, signaling interaction on an interface between the base stations and signaling interaction on an air interface can be reduced, thereby reducing signaling overheads and a communication latency.

Figure 3:
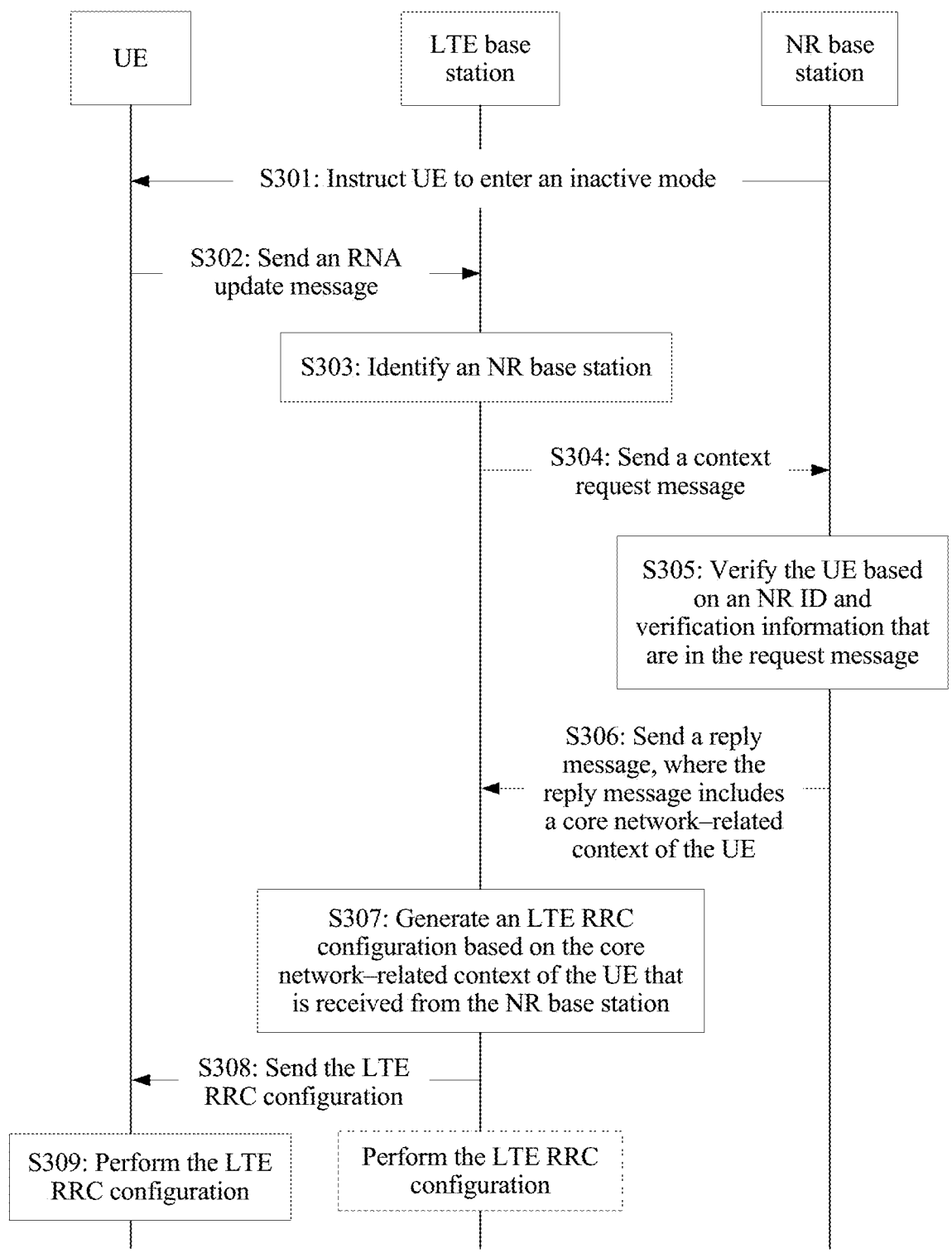
FIG. 3 is a schematic flowchart of signaling for an information transmission method according to an embodiment of this application.

FIG. 3 is a schematic flowchart of signaling for an information transmission method according to an embodiment of this application.

In the embodiment shown in FIG. 3, it is assumed that a first base station is an NR base station and a second base station is an LTE base station. An example in which the NR base station serves as a previous serving base station of UE and the LTE base station serves as a new serving base station of the UE is used for description. It is assumed that the UE enters an inactive mode in the NR base station, that the UE moves out of an RNA configured by the NR base station and enters an LTE cell of the LTE base station, and that the LTE cell does not belong to the RNA configured by the NR base station. In this case, the UE initiates an area update.

S301: The NR base station instructs the UE to enter an inactive mode.

Specifically, the NR base station may send an inactive mode indication to the UE, to instruct the UE to enter the inactive mode. The inactive mode indication includes an identifier (ID) that is allocated by the NR base station to the UE in the inactive mode.

For ease of description, the identifier allocated by the NR base station to the UE in the inactive mode is referred to as an "NR ID" in the following embodiment.

The inactive mode indication may further include an RNA identifier. Specifically, the RNA identifier may be cell identifiers of one or more cells in the RNA, or may be a location area identifier such as a TAI, in an LTE system or a 5G system, in the RNA.

In this embodiment, a format of the NR ID is different from a format of an ID (referred to as an "LTE ID" below) allocated by the LTE base station to the UE in a light connected mode. For example, the NR ID and the LTE ID have different lengths. For detailed descriptions of the format of the NR ID and the format of the LTE ID, refer to the related content in the embodiment shown in FIG. 2. Details are not described again.

After entering the inactive mode, the UE may retain a context related to the NR base station.

S302: The UE sends an RNA update message to the LTE base station, where the RNA update message includes the foregoing NR ID.

Specifically, when the UE moves out of the RNA configured by the NR base station for the UE, the UE needs to initiate an RNA update process. The RNA update message may include the NR ID and verification information. The LTE base station may request a context of the UE from the NR base station by using the NR ID. The verification information is used by the LTE base station to verify the UE.

For specific content of the RNA update message, refer to the area update message in the embodiment shown in FIG. 2. Details are not described herein again.

Optionally, the UE identifies that a current cell and a previous serving cell are of different RATs. Therefore, when the UE initiates an RNA update, the UE releases an NR RRC-related context. Specifically, the UE may release all RRC contexts except security configuration information.

S303: The LTE base station identifies the NR base station.

Specifically, the LTE base station may identify the NR base station by using the NR ID included in the RNA update message. For specific process descriptions, refer to the related content in the embodiment shown in FIG. 2. Details are not described herein again.

S304: The LTE base station sends a context request message to the NR base station.

The context request message includes the NR ID and the verification information.

Optionally, the message further includes indication information, and the indication information is used to indicate an RAT of the LTE base station.

S305: The NR base station verifies the UE based on the NR ID and verification information that are in the request message.

Specifically, the NR base station may use the NR ID and the verification information for a verification algorithm, and verify an identity of the UE based on a result of the verification algorithm.

S306: The NR base station sends a reply message to the LTE base station, where the reply message includes a core network-related context of the UE.

Specifically, after completing the verification on the UE, the NR base station sends a reply message that includes core network-related information of the UE to the LTE base station. Because the NR base station receives the indication information of the RAT of the LTE base station from the LTE base station, the NR base station may learn that the previous serving base station of the UE and the NR base station are base stations of different RATs, and the NR base station does not need to add an RRC context of the UE in the NR base station to the reply message. The reply message may include only the core network-related information in the context of the UE in the NR base station, in other words, includes only the core network-related context of the UE.

S307: The LTE base station generates an LTE RRC configuration based on the core network-related context of the UE that is received from the NR base station.

Specifically, the core network-related context includes PDU session information and flow information. The LTE base station may generate, based on the information, LTE RRC configurations such as a DRB configuration and a mapping from a flow to a data radio bearer (DRB).

That the LTE base station performs the generated LTE RRC configuration includes: using the generated LTE RRC configuration for an RRC connection to the UE.

Optionally, in S302, when the UE finds that the current serving cell and the previous serving cell are of different RATs, the UE releases the NR RRC-related context. Alternatively, after receiving the LTE RRC configuration sent by the LTE base station, the UE may release the NR RRC-related context, and perform the LTE RRC configuration generated by the LTE base station.

S308: The LTE base station sends the generated LTE RRC configuration to the UE.

S309: The UE performs the LTE RRC configuration generated by the LTE base station.

Specifically, after receiving the LTE RRC configuration, the UE may use the LTE RRC configuration for the RRC connection to the LTE base station.

Optionally, the LTE base station and the NR base station exchange information by using a direct interface. Alternatively, when there is no direct interface between the LTE base station and the NR base station, information exchanged between the LTE base station and the NR base station may be forwarded by using a 5G CN.

It may be understood that the information transmission method provided in the embodiment shown in FIG. 3 may also be used in a paging process or a process in which the UE initiates a service request.

According to the information transmission method provided in this embodiment of this application, for example, the method in the embodiment shown in FIG. 3, the UE enters the inactive mode under an instruction of the NR base station. When the UE in the inactive mode moves to the cell of the LTE base station, the NR base station sends the core network-related context of the UE to the LTE base station according to a request of the LTE base station. The LTE base station generates the LTE RRC configuration for the UE based on the received core network-related context of the UE, to perform the RRC connection between the LTE base station and the UE. Therefore, signaling interaction on an interface between the NR base station and the LTE base station and signaling interaction on an air interface are reduced, thereby reducing signaling overheads and a communication latency.

Figure 4:
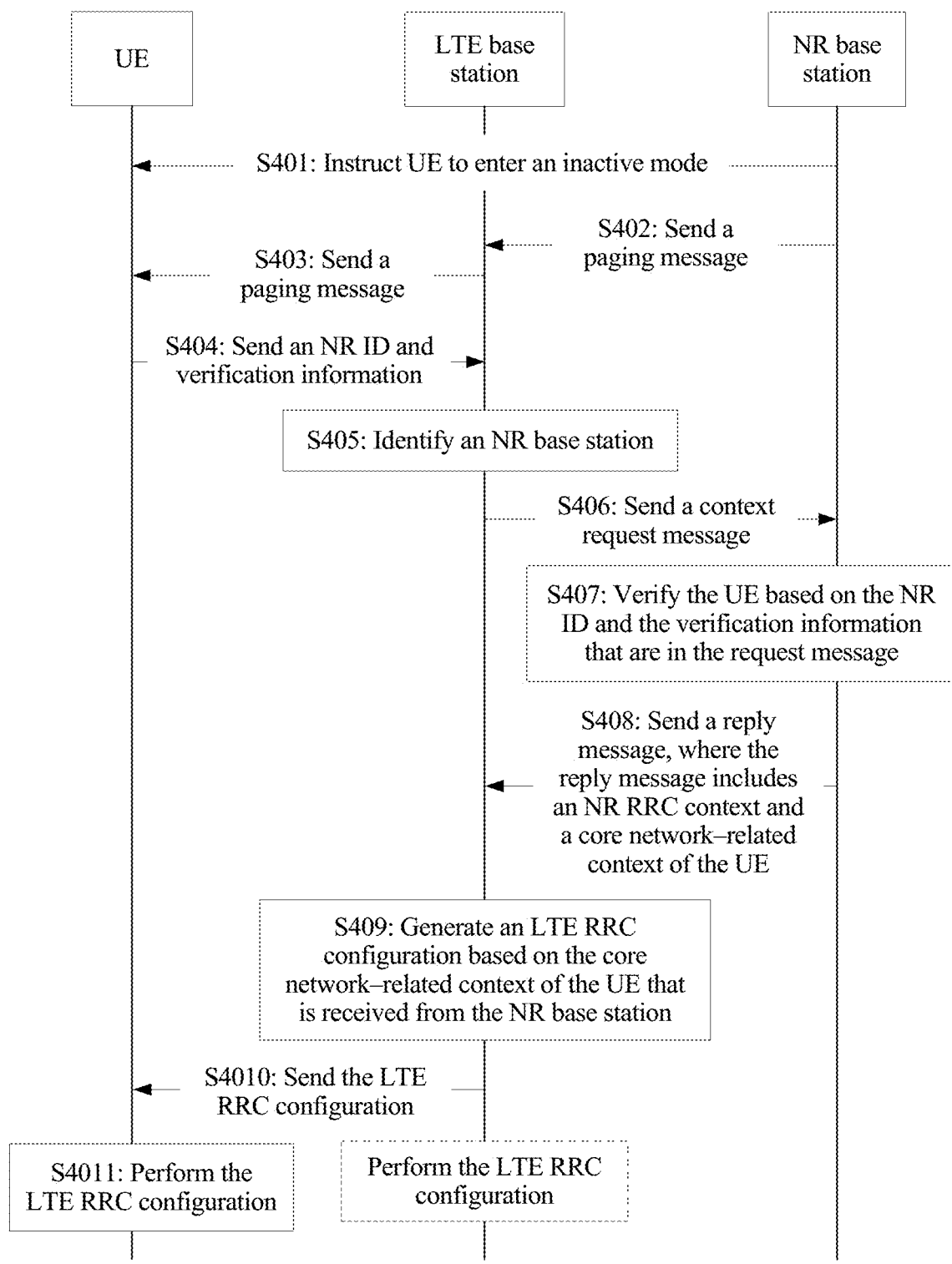
FIG. 4 is a schematic flowchart of signaling for an information transmission method according to an embodiment of this application.

FIG. 4 is a schematic flowchart of signaling for an information transmission method according to an embodiment of this application.

In the embodiment shown in FIG. 4, it is assumed that a first base station is an NR base station and a second base station is an LTE base station. An example in which the NR base station serves as a previous serving base station of UE, the LTE base station serves as a new serving base station of the UE, and the LTE base station needs to send downlink data to the UE is used for description. In this embodiment, the UE enters an inactive mode under an instruction of the NR base station.

S401: The NR base station instructs the UE to enter an inactive mode.

Specifically, an inactive mode indication sent by the NR base station to the UE includes an identifier allocated by the NR base station to the UE in the inactive mode.

For ease of description, the identifier allocated by the NR base station to the UE in the inactive mode is referred to as an "NR ID" in the following embodiment. For detailed descriptions of the NR ID, refer to the related content in another embodiment of this application. Details are not described herein again.

After entering the inactive mode, the UE may retain a context related to the NR base station.

S402: The NR base station sends a paging message to the LTE base station.

The paging message includes the NR ID. The LTE base station parses the paging message sent by the NR base station, and initiates paging to the UE.

S403: The LTE base station sends a paging message to the UE.

Any paging method may be used in a paging process initiated by the LTE base station to the UE, and details are not described herein again.

S404: The UE sends an NR ID and verification information to the LTE base station.

S405: The LTE base station identifies the NR base station.

S406: The LTE base station sends a context request message to the NR base station, where the context request message includes the NR ID and the verification information.

S407: The NR base station verifies the UE based on the NR ID and the verification information that are in the context request message.

For detailed descriptions of steps S404 to S407, refer to steps S303 to S305 in the embodiment shown in FIG. 3. Details are not described herein again.

S408: The NR base station sends a reply message to the LTE base station, where the reply message includes an NR RRC context and a core network-related context of the UE.

S409: The LTE base station generates an LTE RRC configuration based on the core network-related context of the UE that is received from the NR base station.

Specifically, in this embodiment, the NR base station sends both the NR RRC context and the core network-related context to the LTE base station. The LTE base station can identify, by using the NR ID, that a peer base station and the LTE base station are base stations of different RATs. Further, the LTE base station may identify, by using the NR ID, which NR base station is the peer base station. Therefore, the LTE base station retains the NR RRC context and generates the LTE RRC configuration for the UE by using core network-related information in the core network-related context. In addition, the LTE base station performs the generated LTE RRC configuration.

For detailed descriptions of how to generate the LTE RRC configuration, refer to the related content in another embodiment of this application. Details are not described herein again.

S4010: The LTE base station sends the generated LTE RRC configuration to the UE.

S4011: The UE performs the LTE RRC configuration generated by the LTE base station.

Optionally, in an implementation of this application, if the NR base station once obtains, from another LTE base station, an LTE RRC context of the UE in the another LTE base station, and a context of the UE that is sent by the NR base station to the serving LTE base station of the UE includes the LTE RRC context, the NR RRC context, and the core network-related context, the LTE base station retains the NR RRC context, and performs an RRC connection to the UE by using an RRC configuration in the LTE RRC context and the core network-related information in the core network-related context. In this implementation, the UE also retains the LTE RRC configuration generated for the UE by the another LTE base station that serves as a serving base station, and the UE may directly perform the retained LTE RRC configuration. Because the LTE base station and the UE respectively use retained LTE RRC configurations, the LTE base station does not need to generate a new RRC configuration for the UE, thereby improving efficiency of performing the RRC connection between the LTE base station and the UE.

Optionally, in an implementation of this application, if the LTE base station obtains the LTE RRC context of the UE in the another LTE base station, the LTE base station may update some or all LTE RRC configurations in the LTE RRC context in the another LTE base station based on an actual running status of the LTE base station, and send the updated LTE RRC configurations to the UE. The UE uses, for the RRC connection to the LTE base station, the updated LTE RRC configurations and the LTE RRC configuration retained locally by the UE.

It may be understood that the information transmission method provided in the embodiment shown in FIG. 4 may also be used by the UE to initiate an area update process or a paging process.

According to the information transmission method provided in this embodiment of this application, for example, the method in the embodiment shown in FIG. 4, the UE enters the inactive mode under an instruction of the NR base station. When the UE in the inactive mode moves to a cell of the LTE base station, the NR base station sends, to the LTE base station according to a request of the LTE base station, a context of the UE that includes the core network-related context and the NR RRC context of the UE. The LTE base station generates the LTE RRC configuration for the UE based on the received core network-related context of the UE, to perform an RRC connection between the LTE base station and the UE. Therefore, signaling interaction on an interface between the NR base station and the LTE base station and signaling interaction on an air interface are reduced, thereby reducing signaling overheads and a communication latency. Further, the LTE base station retains the NR RRC context. When the UE accesses an NR-RAT base station again, the LTE base station may send the NR RRC context to the NR-RAT base station, and the NR-RAT base station directly uses the NR RRC context, thereby improving utilization of the context of the UE, and shortening a latency of accessing the NR-RAT base station by the UE.

It may be understood that the foregoing embodiments in FIG. 3 and FIG. 4 are described by using an example in which the first base station is an NR base station and the second base station is an LTE base station. This cannot constitute any limitation on the embodiments of this application. For example, in another implementation of this application, the first base station may be an LTE base station, and the second base station may be an NR base station. In this case, the LTE base station may instruct the UE to enter a light connected mode. In a process of initiating an area update process, a paging process, or a service request process, the UE may send, to the NR base station that serves as a new serving base station, an identifier allocated to the UE by the LTE base station that serves as an anchor base station, so that the NR base station obtains a context of the UE from the LTE base station, and completes an RRC configuration of the UE in the NR base station. A specific procedure is similar to a procedure of an information transmission method described in another embodiment of this application, and details are not described herein again. In addition, the first base station and the second base station may be other base stations of different RATs, and details are not described herein.

It may be understood that the information transmission method in the embodiment shown in FIG. 2 is further described in the embodiment shown in FIG. 3 or FIG. 4, and the content described in the embodiments of this application may be mutually referenced.

Figure 5:
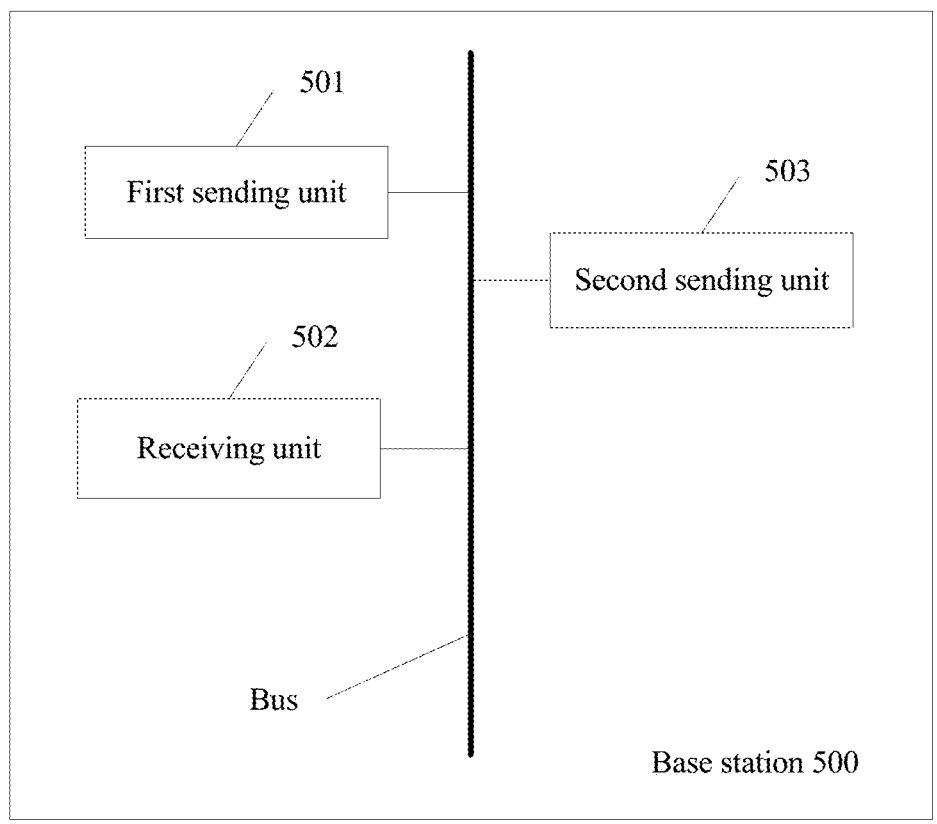
FIG. 5 is a schematic structural diagram of a base station 500 according to an embodiment of this application.

FIG. 5 is a schematic structural diagram of a base station 500 according to an embodiment of this application.

The base station 500 may be applied to the communications system shown in FIG. 1. The base station 500 may perform an operation performed by the first base station in any one of the embodiments shown in FIG. 2 to FIG. 4.

The base station 500 includes: a first sending unit 501, configured to send a first indication to UE, where the first indication includes a first identifier allocated by the base station to the UE, the first indication is used to instruct the UE to enter a non-connected mode, and the first identifier is an identifier of the UE in the non-connected mode in an area configured by the base station; a receiving unit 502, configured to receive a request message from a second base station, where the request message is used to request a context of the UE from the base station 500, and the request message includes the first identifier; and a second sending unit 503, configured to send the context of the UE to the second base station.

The base station 500 is a first-RAT base station, and the second base station is a second-RAT base station. In other words, an RAT of the base station 500 is different from an RAT of the second base station.

In a moving process, the UE may be handed over from the base station 500 to the second base station. The base station 500 is a previous serving base station of the UE, and the second base station is a current serving base station of the UE.

The non-connected mode may be a third mode other than an idle mode and a connected mode of the UE, for example, a light connected mode or an inactive mode. For specific content, refer to related descriptions in some embodiments of the methods in this application. Details are not described herein again.

A format of the first identifier is corresponding to the RAT of the base station 500, and is different from a format of an identifier allocated by the second base station to the UE in the non-connected mode. For example, identifiers allocated by base stations of different RATs to the UE have different lengths. For detailed descriptions of the first identifier, refer to the related content in some embodiments of the methods in this application. Details are not described herein again.

Optionally, the second sending unit 503 is specifically configured to send a core network-related context of the UE to the second base station.

Optionally, the second sending unit 503 is specifically configured to send a core network-related context and a key of the UE to the second base station. The key belongs to a first-RAT RRC context of the UE.

Optionally, the second sending unit 503 is specifically configured to send a first-RAT RRC context of the UE and a core network-related context of the UE to the second base station.

Optionally, the second sending unit 503 is specifically configured to send a first-RAT RRC context of the UE, a second-RAT RRC context of the UE, and a core network-related context of the UE to the second base station.

It may be understood that the context of the UE that is sent by the base station 500 to the second base station may include different content. For detailed descriptions of the context of the UE, refer to the related content in some embodiments of the methods in this application. Details are not described herein again.

Optionally, the receiving unit 502 is further configured to receive indication information from the second base station. The indication information is used to indicate an RAT of the second base station. For detailed descriptions of the indication information, refer to the related content in some embodiments of the methods in this application. Details are not described herein again.

Optionally, the core network-related context includes one or more types of the following information: a TMSI of the UE, core network security information, PDU session information, a core network interface identifier of the UE, and UE capability information. Details are not described herein again.

As shown in FIG. 5, the units of the base station 500 may be interconnected by using a communications bus. Alternatively, the units of the base station 500 may be connected in another connection manner, which is not shown in FIG. 5. This is not specially limited in this embodiment of this application.

Figure 6:
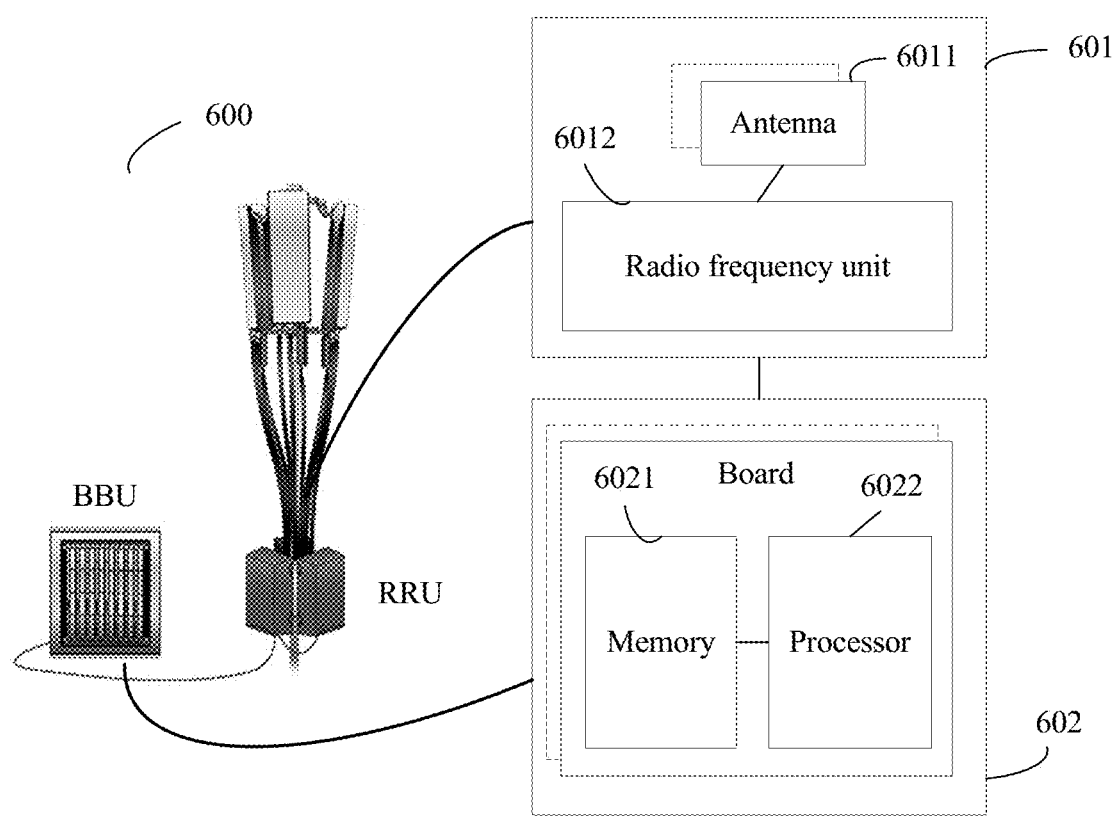
FIG. 6 is a schematic structural diagram of a base station 600 according to an embodiment of this application.

FIG. 6 is a schematic structural diagram of a base station 600 according to an embodiment of this application.

The base station 600 may be applied to the communications system shown in FIG. 1. The base station 600 may perform an operation performed by the first base station in any one of the embodiments shown in FIG. 2 to FIG. 4.

The base station 600 includes one or more remote radio units (RRU) 601 and one or more baseband units (BBU) 602. The RRU 601 may be referred to as a transceiver unit, a transceiver, a transceiver circuit or the like, and may include at least one antenna 6011 and a radio frequency unit 6012. The RRU 601 is mainly configured to: send/receive a radio frequency signal, and perform conversion between the radio frequency signal and a baseband signal, for example, configured to send, to UE, information such as a signaling indication described in the foregoing method embodiments. The BBU 602 is mainly configured to: perform baseband processing, control the base station, or the like. The RRU 601 and the BBU 602 may be physically disposed together, or may be physically disposed separately, to be specific, in a distributed base station. Alternatively, an operation of the BBU 602 may be performed by a central unit (CU), and an operation of the RRU 601 is performed by a distributed unit (DU) or a TRP.

The BBU 602 is a control center of the base station, may also be referred to as a processing unit, and is mainly configured to complete a baseband processing function such as channel coding, multiplexing, modulation, or spreading. For example, the BBU 602 (the processing unit) may be configured to control the base station 600 to perform the operation performed by the first base station in the embodiments shown in FIG. 2 to FIG. 4.

In an example, the BBU 602 may include one or more boards. A plurality of boards may jointly support a radio access network (for example, an LTE access network or an NR access network) of a single access RAT, or may support radio access networks of different access RATs. The BBU 602 further includes a memory 6021 and a processor 6022. The memory 6021 is configured to store a necessary instruction and necessary data. For example, the memory 6021 stores the context of the UE in the foregoing embodiments. The processor 6022 is configured to control the base station 600 to perform a necessary action, for example, configured to control the base station 600 to perform an action of the first base station in the embodiments shown in FIG. 2 to FIG. 4. The memory 6021 and the processor 6022 may serve one or more boards. In other words, a memory and a processor may be disposed on each board, or a plurality of boards may share a same memory and processor. In addition, a necessary circuit is further disposed on each board.

In an example, the BBU 602 further includes a communications unit 6023. The communications unit 6023 is configured to support the base station 600 to communicate with a network element such as another base station device or a core network device. For example, the communications unit 6023 supports the base station 600 in receiving a request message of a second base station and sending the context of the UE to the second base station. The communications unit 6023 may include a communications interface, for example, a communications interface between the base station 600 and the second base station, or a communications interface between the base station 600 and the core network device.

The base station 500 or the base station 600 provided in the embodiments of this application sends the context of the UE to the second base station according to a request of the second base station. The request message of the second base station includes the first identifier, and the first identifier is the identifier of the UE in the non-connected mode in the area configured by the first base station. The context of the UE includes the core network-related context. The second base station may use the core network-related context when performing a corresponding RRC configuration based on the context of the UE, including generating an RRC configuration for the UE; or the second base station may directly perform an RRC configuration, in the context of the UE, corresponding to the RAT of the second base station. The RAT of the base station 500 or an RAT of the base station 600 is different from the RAT of the second base station. Therefore, in a communication process between the second base station and the UE, signaling interaction on an interface between the base stations and signaling interaction on an air interface can be reduced, thereby reducing signaling overheads and a communication latency.

Figure 7:
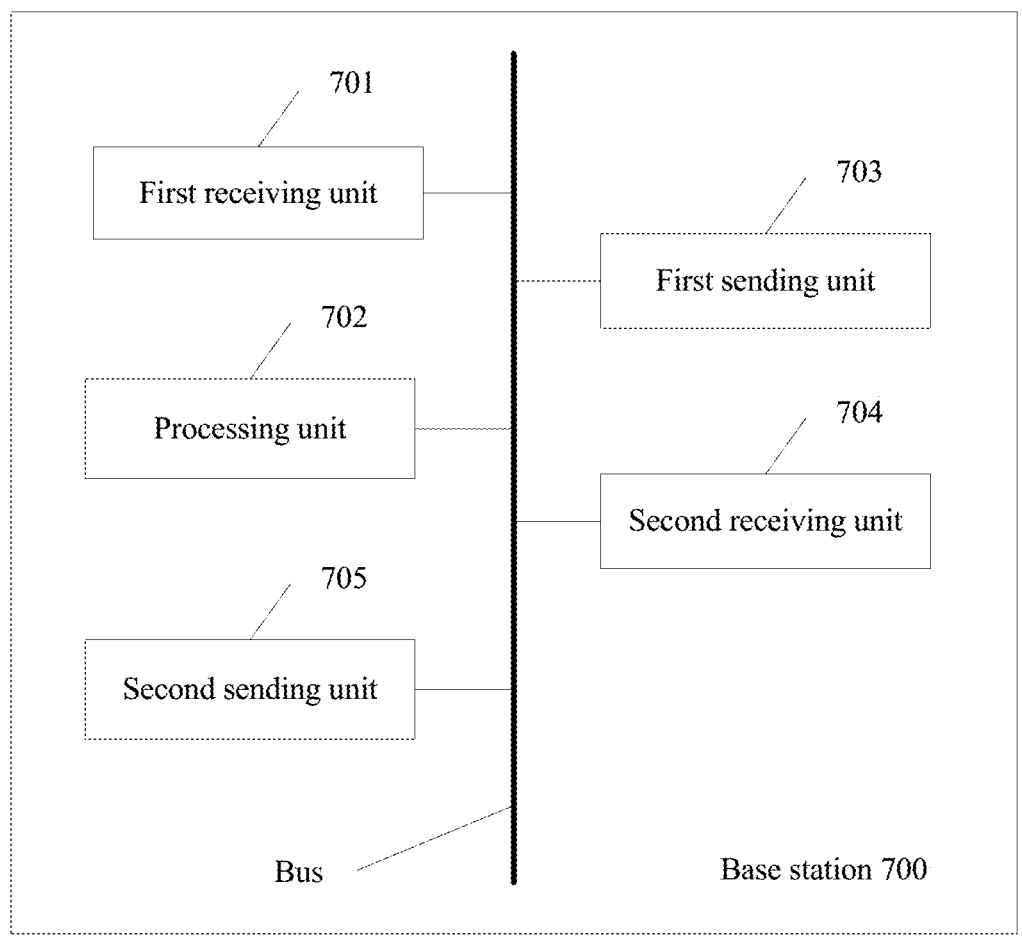
FIG. 7 is a schematic structural diagram of a base station 700 according to an embodiment of this application.

FIG. 7 is a schematic structural diagram of a base station 700 according to an embodiment of this application.

The base station 700 may be applied to the communications system shown in FIG. 1. The base station 700 may perform an operation performed by the second base station in any one of the embodiments shown in FIG. 2 to FIG. 4.

The base station 700 includes a first receiving unit 701, a processing unit 702, a first sending unit 703, a second receiving unit 704, and a second sending unit 705.

The first receiving unit 701 is configured to receive, from UE, a first identifier allocated by a first base station to the UE. The first identifier is an identifier of the UE in a non-connected mode in an area configured by the first base station.

The processing unit 702 is configured to identify the first base station based on the first identifier.

For detailed descriptions of the first base station, refer to the related content in some embodiments of the methods in this application. Details are not described herein again.

The first sending unit 703 is configured to send a request message to the first base station. The request message is used to request a context of the UE from the first base station, and the request message includes the first identifier.

The second receiving unit 704 is configured to receive the context of the UE from the first base station.

The processing unit 702702 is further configured to perform an RRC configuration based on the context of the UE.

The first base station is a first-RAT base station, and the base station 700 is a second-RAT base station. In other words, an RAT of the base station 700 is different from an RAT of the first base station.

In a moving process, the UE may be handed over from the first base station to the base station 700. The first base station is a previous serving base station of the UE, and the base station 700 is a current serving base station of the UE.

The non-connected mode may be a third mode other than an idle mode and a connected mode of the UE, for example, a light connected mode or an inactive mode. For specific content, refer to related descriptions in some embodiments of the methods in this application. Details are not described herein again.

A format of the first identifier is corresponding to the RAT of the first base station, and is different from a format of an identifier allocated by the second base station to the UE in the non-connected mode. For example, identifiers allocated by base stations of different RATs to the UE have different lengths. For detailed descriptions of the first identifier, refer to the related content in another embodiment of this application. Details are not described herein again.

Optionally, the second receiving unit 704 is specifically configured to receive a core network-related context of the UE from the first base station.

Optionally, the second receiving unit 704 is specifically configured to receive a core network-related context of the UE and a first-RAT RRC context of the UE from the first base station.

Optionally, the second receiving unit 704 is specifically configured to receive a core network-related context of the UE, a first-RAT RRC context of the UE, and a second-RAT RRC context of the UE from the first base station.

It may be understood that the context of the UE that is received by the base station 700 from the first base station may include different content. For detailed descriptions of the context of the UE, refer to the related content in some embodiments of the methods in this application. Details are not described herein again.

Optionally, the processing unit 702 is specifically configured to generate a second-RAT RRC configuration based on the context of the UE; and the second sending unit 705 sends the second-RAT RRC configuration to the UE. Specifically, the processing unit 702 may use the received core network-related context of the UE to generate the second-RAT RRC configuration, and the second sending unit 705 sends the generated RRC configuration to the UE. In addition, the processing unit 702 performs the generated RRC configuration. For descriptions of a specific manner of generating the second-RAT RRC configuration, refer to related descriptions in another embodiment of this application. Details are not described herein again.

Optionally, the processing unit 702 is specifically configured to perform a second-RAT RRC configuration included in the context of the UE. The second-RAT RRC configuration belongs to the second-RAT RRC context. Specifically, the context of the UE includes a second-RAT RRC context obtained from another base station having a same RAT as the RAT of the base station 700 (namely, another second-RAT base station). The second base station may directly use an RRC configuration in the second-RAT RRC context. For detailed descriptions of the second-RAT RRC configuration included in the context of the UE, refer to the related content in another embodiment of this application. Details are not described herein again.

Optionally, when the context of the UE that is received by the base station 700 includes the second-RAT RRC context obtained from the another second-RAT base station, the processing unit 702 may update some or all RRC configurations in the second-RAT RRC context, and send the updated RRC configurations to the UE. For detailed descriptions of the updated RRC configurations, refer to the related content in another embodiment of this application. Details are not described herein again.

As shown in FIG. 7, the units of the base station 700 may be interconnected by using a communications bus. Alternatively, the units of the base station may be connected in another connection manner, which is not shown in FIG. 7. This is not specially limited in this embodiment of this application.

Figure 8:
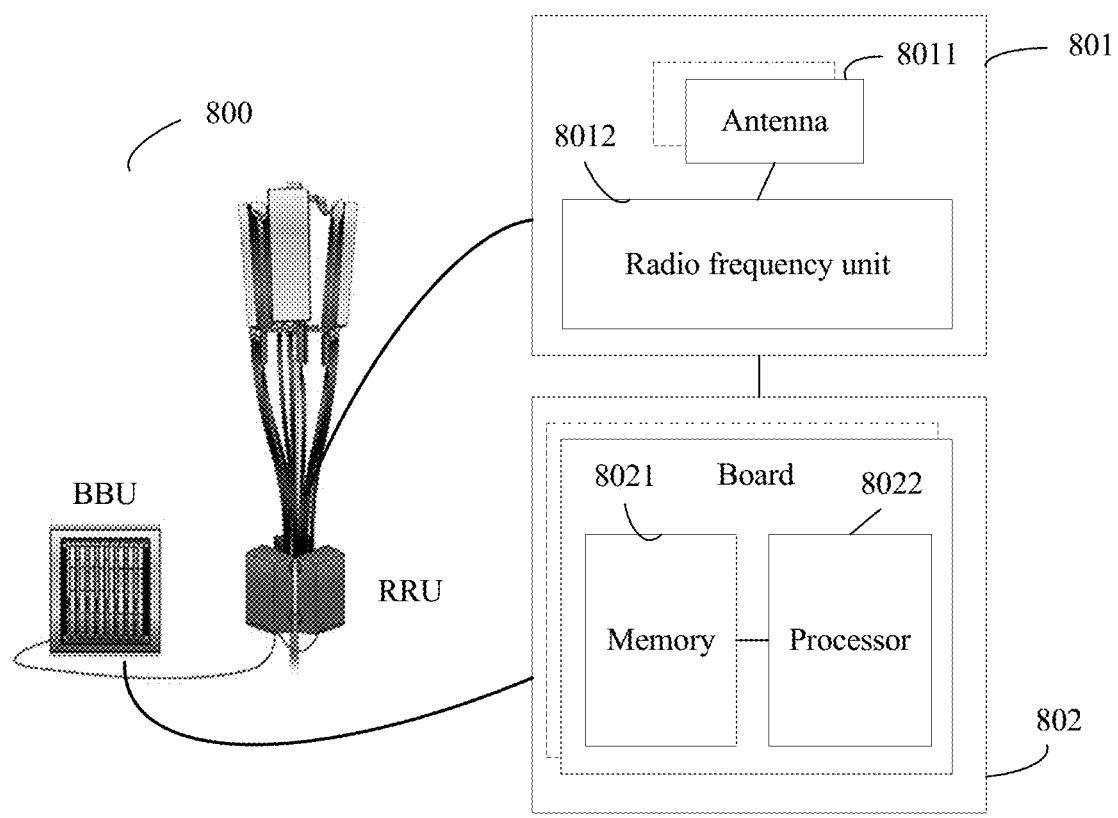
FIG. 8 is a schematic structural diagram of a base station 800 according to an embodiment of this application.

FIG. 8 is a schematic structural diagram of a base station 800 according to an embodiment of this application.

The base station 800 may be applied to the communications system shown in FIG. 1. The base station 800 may perform an operation performed by the second base station in any one of the embodiments shown in FIG. 2 to FIG. 4.

The base station 800 includes one or more RRUs 801 and one or more BBUs 802. Alternatively, an operation of the BBU 802 may be performed by a CU, and an operation of the RRU 801 may be performed by a DU or a TRP.

The BBU 802 may be configured to control the base station 800 to perform the operation performed by the second base station in the embodiments shown in FIG. 2 to FIG. 4.

In an example, the BBU 802 may include one or more boards. A plurality of boards may jointly support a radio access network (for example, an LTE access network or an NR access network) of a single access RAT, or may support radio access networks of different access RATs. The BBU 802 further includes a memory 8021 and a processor 8022. The memory 8021 is configured to store a necessary instruction and necessary data. For example, the memory 8021 stores the context of the UE that is obtained from the first base station in the foregoing embodiments. The processor 8022 is configured to control the base station 800 to perform a necessary action, for example, configured to control the base station 800 to perform an action of the second base station in the embodiments shown in FIG. 2 to FIG. 4.

In an example, the BBU 802 further includes a communications unit 8023. The communications unit 8023 is configured to support the base station 800 to communicate with a network element such as another base station device or a core network device. For example, the communications unit 8023 supports the base station 800 in sending a request message to the first base station and receiving the context of the UE that is sent by the first base station. The communications unit 8023 may include a communications interface, for example, a communications interface between the base station 800 and the first base station, or a communications interface between the base station 800 and the core network device.

For detailed descriptions of functions of the RRU and the BBU and detailed descriptions of functions of apparatuses such as the memory and the processor in the BBU, refer to the related content in the embodiment shown in FIG. 6. Details are not described herein again.

The base station 700 or the base station 800 provided in the embodiments of this application identifies the first base station based on the first identifier received from the UE, where the first identifier is the identifier of the UE in the non-connected mode in the area configured by the first base station; and sends the request message to the first base station, to perform the RRC configuration based on the context of the UE, where the request message is used to request the context of the UE from the first base station, and the RAT of the base station 700 or an RAT of the base station 800 is different from the RAT of the first base station. When performing the RRC configuration, including generating the RRC configuration for the UE, the base station 700 or the base station 800 can use the context of the UE that is sent by the first base station, for example, the core network-related context of the UE. Therefore, in a communication process between the UE and the base station 700 or the base station 800, signaling interaction on an interface between the base stations and signaling interaction on an air interface can be reduced, thereby reducing signaling overheads and a communication latency.

Figure 9:
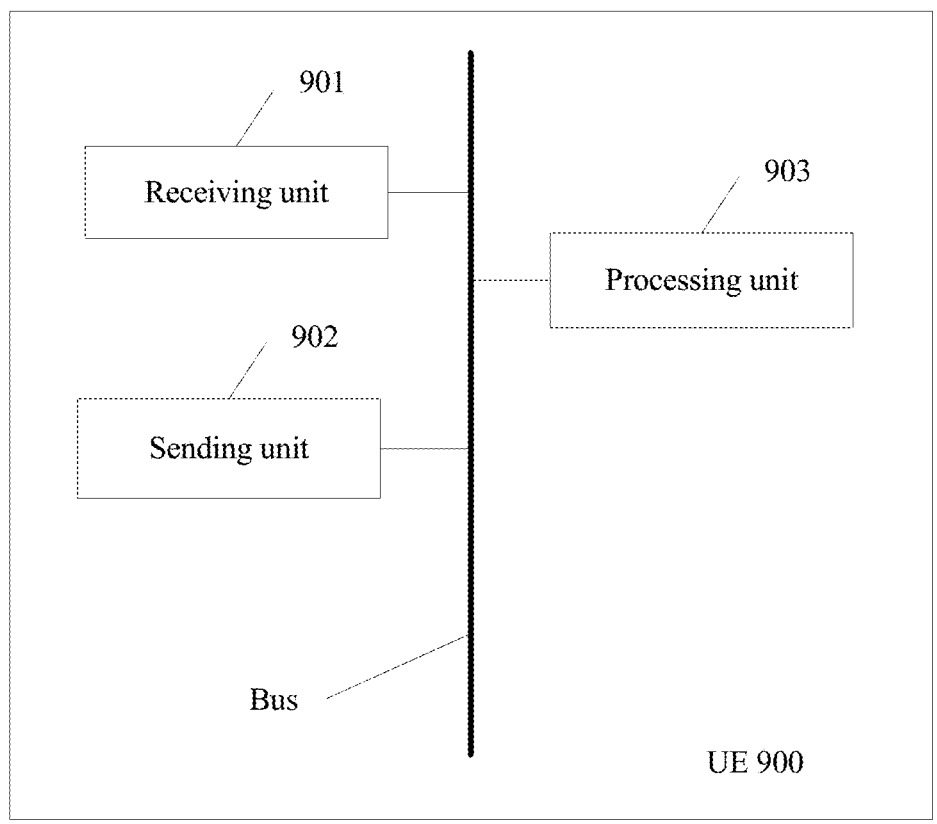
FIG. 9 is a schematic structural diagram of UE 900 according to an embodiment of this application.

FIG. 9 is a schematic structural diagram of UE 900 according to an embodiment of this application.

The UE 900 includes a receiving unit 901, a sending unit 902, and a processing unit 903.

The receiving unit 901 is configured to receive a first indication from a first base station. The first indication includes a first identifier allocated by the first base station to the UE 900, the first indication is used to instruct the UE to enter a non-connected mode, and the first identifier is an identifier of the UE in the non-connected mode in an area configured by the first base station.

Optionally, a format of the first identifier is different from a format of an identifier allocated by the second base station to the UE in the non-connected mode.

Optionally, the sending unit 902 is specifically configured to send an area update message to the second base station. The area update message includes the first identifier.

For detailed descriptions of the first identifier, refer to the related content in another embodiment of this application. Details are not described herein again.

The sending unit 902 is configured to send the first identifier to the second base station. The first identifier is used by the second base station to request a context of the UE from the first base station.

The first base station is a first-RAT base station, and the second base station is a second-RAT base station.

The processing unit 903 is configured to perform an RRC configuration based on the context of the UE.

The RRC configuration may be a second-RAT RRC configuration that is generated by the second base station based on the context of the UE. Alternatively, the RRC configuration may be a second-RAT RRC configuration that is retained by the UE. The UE may perform an RRC connection to the second base station by using the second-RAT RRC configuration. For detailed descriptions of the second-RAT RRC configuration, refer to the related content in another embodiment of this application. Details are not described herein again.

Optionally, the processing unit 903 is further configured to: release a first-RAT RRC context except security configuration information, and retain a core network-related context.

Optionally, the processing unit 903 is further configured to retain a first-RAT RRC context and a core network-related context.

For detailed descriptions of releasing or retaining the first-RAT RRC context by the processing unit 903, refer to the related content in another embodiment of this application. Details are not described herein again.

As shown in FIG. 9, the units of the UE 900 may be interconnected by using a communications bus. Alternatively, the units of the UE may be connected in another connection manner, which is not shown in FIG. 9. This is not specially limited in this embodiment of this application.

Figure 10:
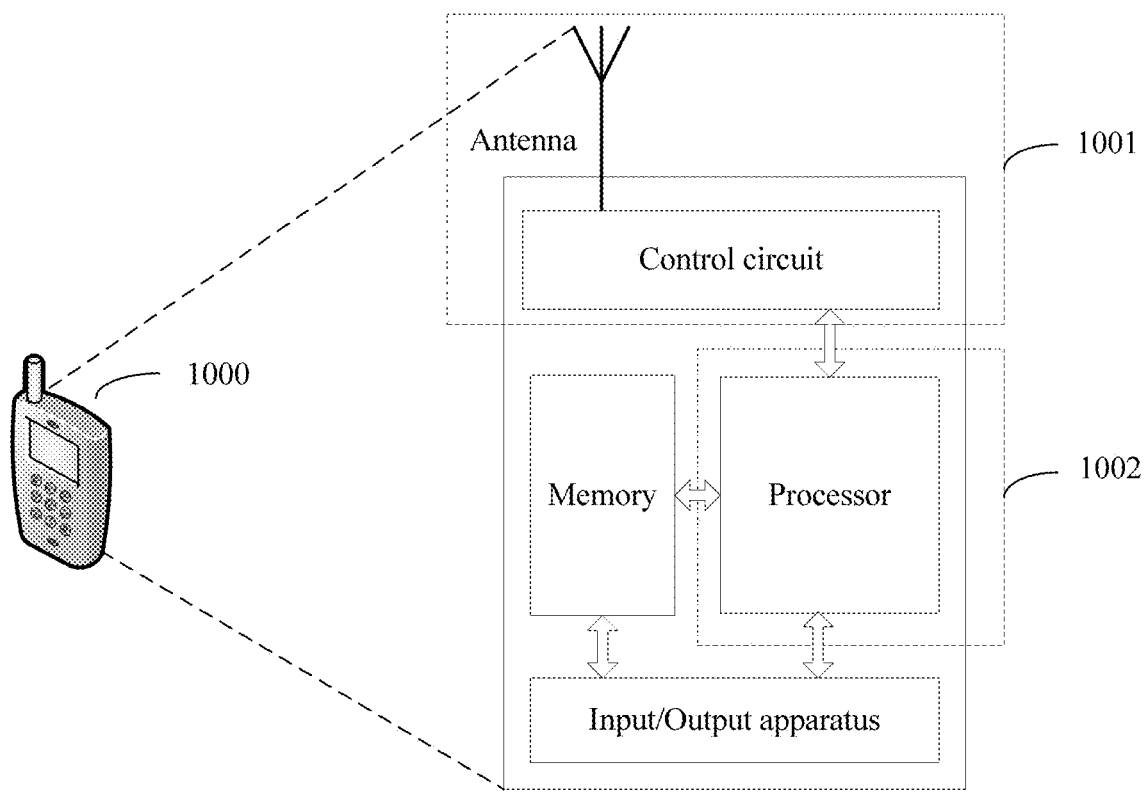
FIG. 10 is a schematic structural diagram of UE 1000 according to an embodiment of this application.

FIG. 10 is a schematic structural diagram of UE 1000.

The UE 1000 may be applied to the communications system shown in FIG. 1. The UE 1000 may perform an operation performed by the UE in any one of the embodiments shown in FIG. 2 to FIG. 4.

For ease of description, FIG. 10 shows only main components of the UE 1000. As shown in FIG. 10, the UE 1000 includes a processor, a memory, a control circuit, an antenna, and an input/output apparatus. The processor is mainly configured to: process a communications protocol and communication data, control the entire user equipment, execute a software program, and process data of the software program, for example, configured to support the UE 1000 in performing an action of the UE that is described in FIG. 2 to FIG. 4. The memory is mainly configured to store the software program and the data, for example, store the context of the UE that is described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to send/receive a radio frequency signal in an electromagnetic wave form. For example, the transceiver may be configured to perform S202 in FIG. 2 to receive a first indication sent by a first base station. For another example, the transceiver may be configured to perform S203 to send a first identifier to a second base station. For details, refer to related descriptions in the embodiments of the methods. The input/output apparatus such as a touchscreen, a display screen, or a keyboard is mainly configured to: receive data entered by a user, and output data to the user.

After the UE is powered on, the processor may read the software program in the memory, interpret and execute an instruction of the software program, and process the data of the software program. When the processor needs to send data by using the antenna, after performing baseband processing on the to-be-sent data, the processor outputs a baseband signal to a radio frequency circuit. After performing radio frequency processing on the baseband signal, the radio frequency circuit sends a radio frequency signal in an electromagnetic wave form by using the antenna. When data is sent to the UE, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 10 shows only one memory and only one processor. Actually, the UE may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communication data. The central processing unit is mainly configured to: control the entire UE, execute the software program, and process the data of the software program. The processor in FIG. 10 integrates functions of the baseband processor and the central processing unit. A person skilled in the art may understand that the baseband processor and the central processing unit may be alternatively processors independent of each other, and are interconnected by using a technology such as a bus. A person skilled in the art may understand that the UE may include a plurality of baseband processors to adapt to different network RATs, and the UE may include a plurality of central processing units to enhance a processing capability of the UE. The components of the UE may be connected by using various buses. The baseband processor may also be expressed as a baseband processing circuit or a baseband processing chip. The central processing unit may also be expressed as a central processing circuit or a central processing chip. A function of processing the communications protocol and the communication data may be embedded into the processor, or may be stored in the memory in a form of a software program. The processor executes the software program to implement a baseband processing function.

For example, in this embodiment of this application, the antenna and the control circuit that have receiving and sending functions may be considered as a transceiver unit 1001 of the UE 1000, and the processor having a processing function is considered as a processing unit 1002 of the UE 1000. As shown in FIG. 10, the UE 1000 includes the transceiver unit 1001 and the processing unit 1002. The transceiver unit may also be referred to as a transceiver, a transceiver apparatus, or the like. Optionally, a component that is in the transceiver unit 1001 and that is configured to implement a receiving function may be considered as a receiving unit, and a component that is in the transceiver unit 1001 and that is configured to implement a sending function may be considered as a sending unit. In other words, the transceiver unit 1001 includes the receiving unit and the sending unit. For example, the receiving unit may also be referred to as a receiver, a receiver, a receiver circuit, or the like, and the sending unit may be referred to as a transmitter, a transmitter, a transmitter circuit, or the like.

The UE 900 or the UE 1000 provided in the embodiments of this application receives the first indication from the first base station, where the first indication includes the first identifier allocated by the first base station to the UE, the first indication is used to instruct the UE to enter the non-connected mode, and the first identifier is the identifier of the UE in the non-connected mode in the area configured by the first base station; sends the first identifier to the second base station, where the first identifier is used by the second base station to request the context of the UE from the first base station; and performs the RRC configuration based on the context of the UE, where an RAT of the first base station is different from an RAT of the second base station. In a process in which the UE accesses the second base station, the UE can perform the RRC configuration generated by the second base station based on the context of the UE that is sent by the first base station, or perform the RRC configuration that is retained locally by the UE. Therefore, in a communication process between the UE and the second base station, signaling interaction on an interface between the base stations and signaling interaction on an air interface can be reduced, thereby reducing signaling overheads and a communication latency.

Figure 11:
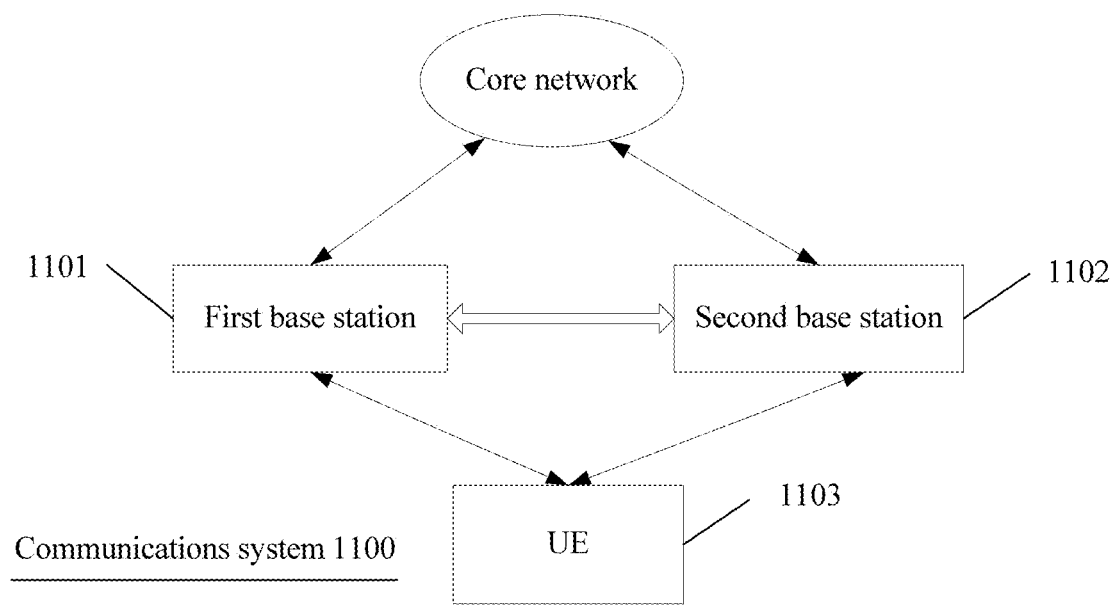
FIG. 11 is a schematic diagram of a communications system 1100 according to an embodiment of this application.

FIG. 11 is a schematic diagram of a communications system 1100 according to an embodiment of this application.

The communications system 1100 includes: a first base station 1101, where the first base station 1101 may perform an operation performed by the first base station in any one of the embodiments shown in FIG. 2 to FIG. 4, and may be specifically the base station in the embodiment shown in FIG. 5 or FIG. 6; and a second base station 1102, where the second base station 1102 may perform an operation performed by the second base station in any one of the embodiments shown in FIG. 2 to FIG. 4, and may be specifically the base station in the embodiment shown in FIG. 7 or FIG. 8.

The communications system 1100 may further include user equipment 1103 that separately communicates with the first base station 1101 and the second base station 1102. The user equipment 1103 may perform an operation performed by the UE in any one of the embodiments shown in FIG. 2 to FIG. 4, and may be specifically the UE or the terminal in the embodiment shown in FIG. 9 or FIG. 10.

The first base station 1101 and the second base station 1102 are base stations of different RATs. In addition, the first base station 1101 and the second base station 1102 are connected to a same core network. For example, the first base station 1101 and the second base station 1102 are an LTE base station and an NR base station connected to a 5G CN.

The user equipment 1103 enters a non-connected mode under an instruction of the first base station 1101. The second base station 1102 may request a context of the UE 1103 from the first base station 1101, to perform an RRC connection to the UE. For a function of each device or a specific operation performed by each device, refer to the related content in another embodiment of this application. Details are not described herein again.

According to the communications system 1100 provided in this embodiment of this application, the UE enters the non-connected mode under the instruction of the first base station. When the UE in the non-connected mode moves to a cell of the second base station, the first base station sends the context of the UE to the second base station according to a request of the second base station. The second base station performs an RRC configuration based on the received context of the UE, to perform the RRC connection between the second base station and the UE. When the second base station performs the RRC configuration, including generating the RRC configuration for the UE, the second base station can use the context of the UE that is sent by the first base station, for example, a core network-related context of the UE. Therefore, in a communication process between the second base station and the UE, signaling interaction on an interface between the base stations and signaling interaction on an air interface can be reduced, thereby reducing signaling overheads and a communication latency.

It may be understood that a processor used in the base station or the UE in the embodiments of this application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various examples of logical blocks, modules, and circuits described with reference to content disclosed in this application. Alternatively, the processor may be a combination of processors implementing a computing function, for example, a combination of one or more microprocessors, or a combination of a DSP and a microprocessor.

The bus in the embodiments of this application may be an industry RAT architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in the accompanying drawing of this application, but this does not mean that there is only one bus or only one type of bus.

A person skilled in the art may clearly understand that, descriptions of the embodiments provided by this application may be mutually referenced. For ease and brevity of description, for example, for functions of the apparatuses and devices and performed steps that are provided in the embodiments of this application, refer to related descriptions in the method embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some procedures or functions according to the embodiments of the present invention are generated. The computer may be a general-purpose computer, a dedicated computer, a computer network, or other programmable apparatuses. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

In the several embodiments provided in this application, it should be understood that the disclosed system, device, and method may be implemented in other manners without departing from the scope of this application. For example, the described embodiment is merely an example. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected based on an actual need to achieve the objectives of the solutions of the embodiments. A person of ordinary skill in the art may understand and implement the embodiments of this application without creative efforts.

In addition, the schematic diagrams illustrating the system, device, method and different embodiments may be combined or integrated with another system, module, technology or method without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
receiving, by a terminal, a first indication from a first base station of a first radio access technology (RAT), wherein the first indication comprises a first identifier allocated by the first base station to the terminal, the first indication instructs the terminal to enter a non-connected mode, and the first identifier identifies the terminal in the non-connected mode in an area configured by the first base station;
upon receiving the first indication, entering, by the terminal, the non-connected mode, and retaining, by the terminal, a radio resource control (RRC) context corresponding to the first RAT;
sending, by the terminal in the non-connected mode, the first identifier to a second base station of a second RAT for the second base station to use to request a context of the terminal from the first base station;
in response to determining that the second RAT is different than the first RAT, releasing, by the terminal, the RRC context corresponding to the first RAT before establishing a RRC connection with the second base station; and
performing, by the terminal after sending the first identifier to the second base station, the RRC connection with the second base station based on RRC configuration information corresponding to the second RAT received from the second base station.

2. The method according to claim 1, wherein the context of the terminal comprises a core network-related context.

3. The method according claim 2, wherein the context of the terminal further comprises at least one of: the RRC context of the terminal corresponding to the first RAT, or a RRC context of the terminal corresponding to the second RAT.

4. The method according to claim 1, wherein releasing the RRC context corresponding to the first RAT comprises:
releasing, by the terminal, the RRC context corresponding to the first RAT without releasing security configuration information, and retaining, by the terminal, a core network-related context.

5. The method according to claim 1, wherein the method further comprises:
retaining, by the terminal, a RRC context corresponding to the first RAT and a core network—related context.

6. The method according to claim 1, wherein sending, by the terminal, the first identifier to the second base station comprises:
sending, by the terminal, an area update message to the second base station, wherein the area update message comprises the first identifier.

7. An apparatus for a terminal, comprising:
a non-transitory memory storage comprising instructions; and
one or more processors in communication with the memory storage, wherein the one or more processors execute the instructions to cause the apparatus to:
receive a first indication from a first base station of a first radio access technology (RAT), wherein the first indication comprises a first identifier allocated by the first base station to the terminal, the first indication instructs the terminal to enter a non-connected mode, and the first identifier identifies the terminal in the non-connected mode in an area configured by the first base station;
upon receiving the first indication, enter the non-connected mode and retain a radio resource control (RRC) context corresponding to the first RAT;
send, with the terminal being in the non-connected mode, the first identifier to a second base station of a second RAT for the second base station to use to request a context of the terminal from the first base station;
in response to determining that the second RAT is different than the first RAT, release the RRC context corresponding to the first RAT before establishing a RRC connection with the second base station; and
perform, after sending the first identifier to the second base station, the RRC connection with the second base station based on RRC configuration information corresponding to the second RAT received from the second base station.

8. The apparatus according to claim 7, wherein the context of the terminal comprises a core network-related context.

9. The apparatus according claim 8, wherein the context of the terminal further comprises at least one of the RRC context of the terminal corresponding to the first RAT, or a second-RAT RRC context of the terminal corresponding to the second RAT.

10. The apparatus according to claim 7, wherein the one or more processors execute the instructions further to:
    release the RRC context corresponding to the first RAT without releasing security configuration information, and retain a core networkrelated context.

11. The terminal according to claim 7, wherein the one or more processors execute the instructions further to:
    retain a RRC context corresponding to the first RAT and a core network-related context.

12. The terminal according to claim 7, wherein the one or more processors execute the instructions further to:
    send an area update message to the second base station, wherein the area update message comprises the first identifier.

13. A non-transitory processor-readable medium having processor-executable instructions stored thereon for a terminal, the processor-executable instructions, when executed by a processor, to cause the terminal to perform:
    receiving a first indication from a first base station of a first RAT, wherein the first indication comprises a first identifier allocated by the first base station to the terminal, the first indication instructs the terminal to enter a non-connected mode, and the first identifier identifies the terminal in the non-connected mode in an area configured by the first base station;
    upon receiving the first indication, entering the non-connected mode, and retaining a RRC context corresponding to the first RAT;
    sending, with the terminal being in the non-connected mode, the first identifier to a second base station of a second RAT for the second base station to use to request a context of the terminal from the first base station;
    in response to determining that the second RAT is different than the first RAT, releasing the RRC context corresponding to the first RAT before establishing a RRC connection with the second base station; and
    performing, after sending the first identifier to the second base station, the RRC connection with the second base station based on RRC configuration information corresponding to the second RAT received from the second base station.

14. The non-transitory processor-readable medium according to claim 13, wherein the context of the terminal comprises a core network-related context.

15. The non-transitory processor-readable medium according claim 14, wherein the context of the terminal further comprises at least one of the RRC context of the terminal corresponding to the first RAT, or a RRC context of the terminal corresponding to the second RAT.

16. The non-transitory processor-readable medium according to claim 13, further comprising instructions that, when executed by the processor, cause the terminal to perform: releasing the RRC context corresponding to the first RAT without releasing security configuration information, and retaining a core network-related context.

17. The non-transitory processor-readable medium according to claim 13, further comprising instructions that, when executed by the processor, cause the terminal to perform: retaining a RRC context corresponding to the first RAT and a core network-related context.

18. The non-transitory processor-readable medium according to claim 13, wherein sending the first identifier to the second base station comprises:
    sending an area update message to the second base station, wherein the area update message comprises the first identifier.

* * * * *